US010423634B1

(12) United States Patent
Shemer et al.

(10) Patent No.: US 10,423,634 B1
(45) Date of Patent: Sep. 24, 2019

(54) TEMPORAL QUERIES ON SECONDARY STORAGE

(71) Applicant: EMC IP Holding Company LLC, Hopkinton, MA (US)

(72) Inventors: Jehuda Shemer, Kfar Saba (IL); Assaf Natanzon, Tel Aviv (IL); Leehod Baruch, Rishon Leziyon (IL); Ron Bigman, Holon (IL); Amit Lieberman, Raanana (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 271 days.

(21) Appl. No.: 15/391,030

(22) Filed: Dec. 27, 2016

(51) Int. Cl.
G06F 17/30 (2006.01)
G06F 16/2458 (2019.01)
G06F 16/23 (2019.01)

(52) U.S. Cl.
CPC ...... *G06F 16/2477* (2019.01); *G06F 16/2358* (2019.01)

(58) Field of Classification Search
None
See application file for complete search history.

(56) References Cited

U.S. PATENT DOCUMENTS

| | | | |
|---|---|---|---|
| 7,203,741 B2 | 4/2007 | Marco et al. | |
| 7,719,443 B1 | 5/2010 | Natanzon | |
| 7,840,536 B1 | 11/2010 | Ahal et al. | |
| 7,840,662 B1 | 11/2010 | Natanzon | |
| 7,844,856 B1 | 11/2010 | Ahal et al. | |
| 7,860,836 B1 | 12/2010 | Natanzon et al. | |
| 7,882,286 B1 | 2/2011 | Natanzon et al. | |
| 7,934,262 B1 | 4/2011 | Natanzon et al. | |
| 7,958,372 B1 | 6/2011 | Natanzon | |
| 8,037,162 B2 | 10/2011 | Marco et al. | |
| 8,041,940 B1 | 10/2011 | Natanzon et al. | |
| 8,060,713 B1 | 11/2011 | Natanzon | |
| 8,060,714 B1 | 11/2011 | Natanzon | |
| 8,103,937 B1 | 1/2012 | Natanzon et al. | |

(Continued)

OTHER PUBLICATIONS

U.S. Non-Final Office Action dated May 15, 2018 for U.S. Appl. No. 15/391,036; 19 Pages.

(Continued)

*Primary Examiner* — Alex Gofman
(74) *Attorney, Agent, or Firm* — Daly, Crowley Mofford & Durkee, LLP

(57) ABSTRACT

A storage system is provided, comprising a processor and a storage array comprising a data storage entity storing computer-accessible data and a container executing within the storage array. The container is configured to run a temporal query service configured to query the data storage entity in the storage array from within the storage array, wherein a structure of a temporal query generated in accordance with the temporal query service comprises a query format configured to be compatible with a temporal structure of the data storage entity. The temporal query service is configured to parse at least a first temporal query received from a requesting entity to determine a set of temporal query parameters relating to data stored on the data storage entity, query the data storage entity with a second temporal query formed in accordance with the set of query parameters, and return temporal query results.

20 Claims, 13 Drawing Sheets

(56) References Cited

U.S. PATENT DOCUMENTS

| | | |
|---|---|---|
| 8,108,634 B1 | 1/2012 | Natanzon et al. |
| 8,131,743 B1 * | 3/2012 | Joyce ............... G06F 17/30436 707/759 |
| 8,214,612 B1 | 7/2012 | Natanzon |
| 8,250,149 B2 | 8/2012 | Marco et al. |
| 8,271,441 B1 | 9/2012 | Natanzon et al. |
| 8,271,447 B1 | 9/2012 | Natanzon et al. |
| 8,332,687 B1 | 12/2012 | Natanzon et al. |
| 8,335,761 B1 | 12/2012 | Natanzon |
| 8,335,771 B1 | 12/2012 | Natanzon et al. |
| 8,341,115 B1 | 12/2012 | Natanzon et al. |
| 8,370,648 B1 | 2/2013 | Natanzon |
| 8,380,885 B1 | 2/2013 | Natanzon |
| 8,392,680 B1 | 3/2013 | Natanzon et al. |
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B1 | 8/2013 | Natanzon |
| 8,543,609 B1 | 9/2013 | Natanzon |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,115 B1 | 8/2014 | Patel et al. |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,862,818 B1 | 10/2014 | Ozdemir |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |
| 9,305,009 B1 | 4/2016 | Bono et al. |
| 9,323,750 B2 | 4/2016 | Natanzon et al. |
| 9,330,155 B1 | 5/2016 | Bono et al. |
| 9,336,094 B1 | 5/2016 | Wolfson et al. |
| 9,336,230 B1 | 5/2016 | Natanzon |
| 9,367,260 B1 | 6/2016 | Natanzon |
| 9,378,096 B1 | 6/2016 | Erel et al. |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 9,454,326 B1 | 9/2016 | Bono et al. |
| 9,459,804 B1 | 10/2016 | Natanzon et al. |
| 9,460,028 B1 | 10/2016 | Raizen et al. |
| 9,471,579 B1 | 10/2016 | Natanzon |
| 9,477,407 B1 | 10/2016 | Marshak et al. |
| 9,501,542 B1 | 11/2016 | Natanzon |
| 9,507,732 B1 | 11/2016 | Natanzon et al. |
| 9,507,845 B1 | 11/2016 | Natanzon et al. |
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 9,547,459 B1 | 1/2017 | BenHanokh et al. |
| 9,547,591 B1 | 1/2017 | Natanzon et al. |
| 9,552,405 B1 | 1/2017 | Moore et al. |
| 9,557,921 B1 | 1/2017 | Cohen et al. |
| 9,557,925 B1 | 1/2017 | Natanzon |
| 9,563,517 B1 | 2/2017 | Natanzon et al. |
| 9,563,684 B1 | 2/2017 | Natanzon et al. |
| 9,575,851 B1 | 2/2017 | Natanzon et al. |
| 9,575,857 B1 | 2/2017 | Natanzon |
| 9,575,894 B1 | 2/2017 | Natanzon et al. |
| 9,582,382 B1 | 2/2017 | Natanzon et al. |
| 9,588,703 B1 | 3/2017 | Natanzon et al. |
| 9,588,847 B1 | 3/2017 | Natanzon et al. |
| 9,594,822 B1 | 3/2017 | Natanzon et al. |
| 9,600,377 B1 | 3/2017 | Cohen et al. |
| 9,619,543 B1 | 4/2017 | Natanzon et al. |
| 9,632,881 B1 | 4/2017 | Natanzon |

(56) References Cited

U.S. PATENT DOCUMENTS

| | | |
|---|---|---|
| 9,665,305 B1 | 5/2017 | Natanzon et al. |
| 9,710,177 B1 | 7/2017 | Natanzon |
| 9,720,618 B1 | 8/2017 | Panidis et al. |
| 9,722,788 B1 | 8/2017 | Natanzon et al. |
| 9,727,429 B1 | 8/2017 | Moore et al. |
| 9,733,969 B2 | 8/2017 | Derbeko et al. |
| 9,737,111 B2 | 8/2017 | Lustik |
| 9,740,572 B1 | 8/2017 | Natanzon et al. |
| 9,740,573 B1 | 8/2017 | Natanzon |
| 9,740,880 B1 | 8/2017 | Natanzon et al. |
| 9,749,300 B1 | 8/2017 | Cale et al. |
| 9,772,789 B1 | 9/2017 | Natanzon et al. |
| 9,798,472 B1 | 10/2017 | Natanzon et al. |
| 9,798,490 B1 | 10/2017 | Natanzon |
| 9,804,934 B1 | 10/2017 | Natanzon et al. |
| 9,811,431 B1 | 11/2017 | Natanzon et al. |
| 9,823,865 B1 | 11/2017 | Natanzon et al. |
| 9,823,973 B1 | 11/2017 | Natanzon |
| 9,832,261 B2 | 11/2017 | Don et al. |
| 9,846,698 B1 | 12/2017 | Panidis et al. |
| 9,875,042 B1 | 1/2018 | Natanzon et al. |
| 9,875,162 B1 | 1/2018 | Panidis et al. |
| 9,880,777 B1 | 1/2018 | Bono et al. |
| 9,881,014 B1 | 1/2018 | Bono et al. |
| 9,910,620 B1 | 3/2018 | Veprinsky et al. |
| 9,910,621 B1 | 3/2018 | Golan et al. |
| 9,910,735 B1 | 3/2018 | Natanzon |
| 9,910,739 B1 | 3/2018 | Natanzon et al. |
| 9,917,854 B2 | 3/2018 | Natanzon et al. |
| 9,921,955 B1 | 3/2018 | Derbeko et al. |
| 9,933,957 B1 | 4/2018 | Cohen et al. |
| 9,934,302 B1 | 4/2018 | Cohen et al. |
| 9,940,205 B2 | 4/2018 | Natanzon |
| 9,940,460 B1 | 4/2018 | Derbeko et al. |
| 9,946,649 B1 | 4/2018 | Natanzon et al. |
| 9,959,061 B1 | 5/2018 | Natanzon et al. |
| 9,965,306 B1 | 5/2018 | Natanzon et al. |
| 9,990,256 B1 | 6/2018 | Natanzon |
| 9,996,539 B1 | 6/2018 | Natanzon |
| 10,007,626 B1 | 6/2018 | Saad et al. |
| 10,019,194 B1 | 7/2018 | Baruch et al. |
| 10,025,931 B1 | 7/2018 | Natanzon et al. |
| 10,031,675 B1 | 7/2018 | Veprinsky et al. |
| 10,031,690 B1 | 7/2018 | Panidis et al. |
| 10,031,692 B2 | 7/2018 | Elron et al. |
| 10,031,703 B1 | 7/2018 | Natanzon et al. |
| 10,037,251 B1 | 7/2018 | Bono et al. |
| 10,042,579 B1 | 8/2018 | Natanzon |
| 10,042,751 B1 | 8/2018 | Veprinsky et al. |
| 10,055,146 B1 | 8/2018 | Natanzon et al. |
| 10,055,148 B1 | 8/2018 | Natanzon et al. |
| 10,061,666 B1 | 8/2018 | Natanzon et al. |
| 10,067,694 B1 | 9/2018 | Natanzon et al. |
| 10,067,837 B1 | 9/2018 | Natanzon et al. |
| 10,078,459 B1 | 9/2018 | Natanzon et al. |
| 10,082,980 B1 | 9/2018 | Cohen et al. |
| 10,083,093 B1 | 9/2018 | Natanzon et al. |
| 10,089,209 B1 | 10/2018 | Russell |
| 10,095,489 B1 | 10/2018 | Lieberman et al. |
| 10,101,943 B1 | 10/2018 | Ayzenberg et al. |
| 2003/0177307 A1 | 9/2003 | Lewalski-Brechter |
| 2008/0098045 A1* | 4/2008 | Radhakrishnan ............ G06F 17/30551 |
| 2011/0313973 A1 | 12/2011 | Srivas et al. |
| 2015/0293817 A1* | 10/2015 | Subramanian .... G06F 17/30212 707/645 |
| 2016/0004721 A1* | 1/2016 | Iyer ............... G06F 17/30212 707/649 |
| 2016/0162320 A1 | 6/2016 | Singh et al. |
| 2016/0179410 A1 | 6/2016 | Haas et al. |
| 2016/0328257 A1 | 11/2016 | Hudzia et al. |
| 2017/0308330 A1 | 10/2017 | Suresh et al. |
| 2018/0102985 A1 | 4/2018 | Byers et al. |
| 2018/0115525 A1 | 4/2018 | Chou et al. |

OTHER PUBLICATIONS

Robinson, "EMC Details Open Source Storage Framework to Support Container-Based Applications;" Incisive Business Media Limited; Nov. 20, 2016; 2 Pages.

U.S. Appl. No. 15/391,036, filed Dec. 27, 2016, Baruch et al.

Final Office Action dated Oct. 25, 2018 for U.S. Appl. No. 15/391,036; 13 Pages.

Response to Office Action dated May 15, 2018 for U.S. Appl. No. 15/391,036 filed Aug. 15, 2018; 14 Pages.

Notice of Allowance dated Mar. 14, 2019 for U.S. Appl. No. 15/391,036; 7 pages.

Response to U.S. Final Office Action dated Oct. 25, 2018 for U.S. Appl. No. 15/391,036; Response filed Feb. 19, 2019; 13 Pages.

\* cited by examiner

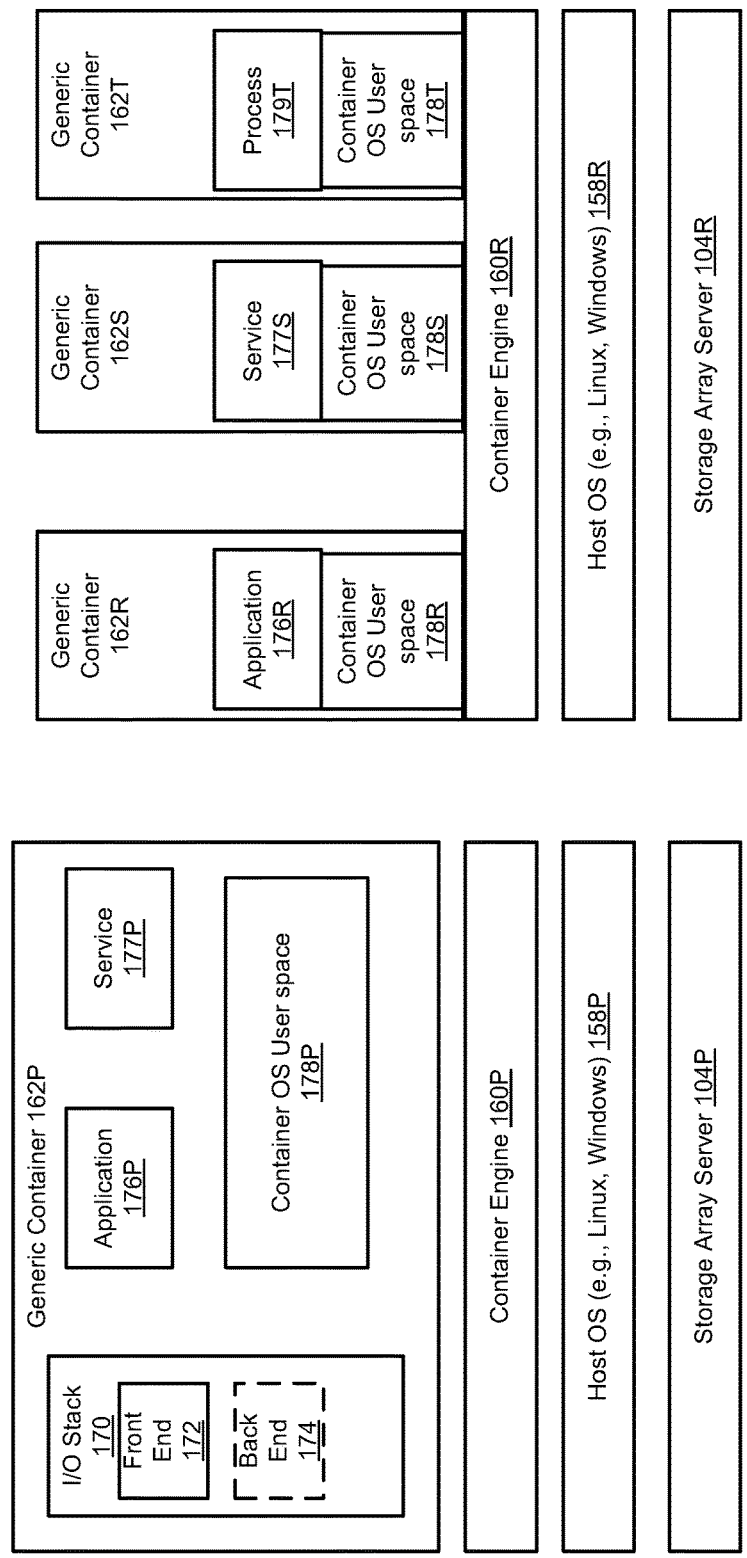

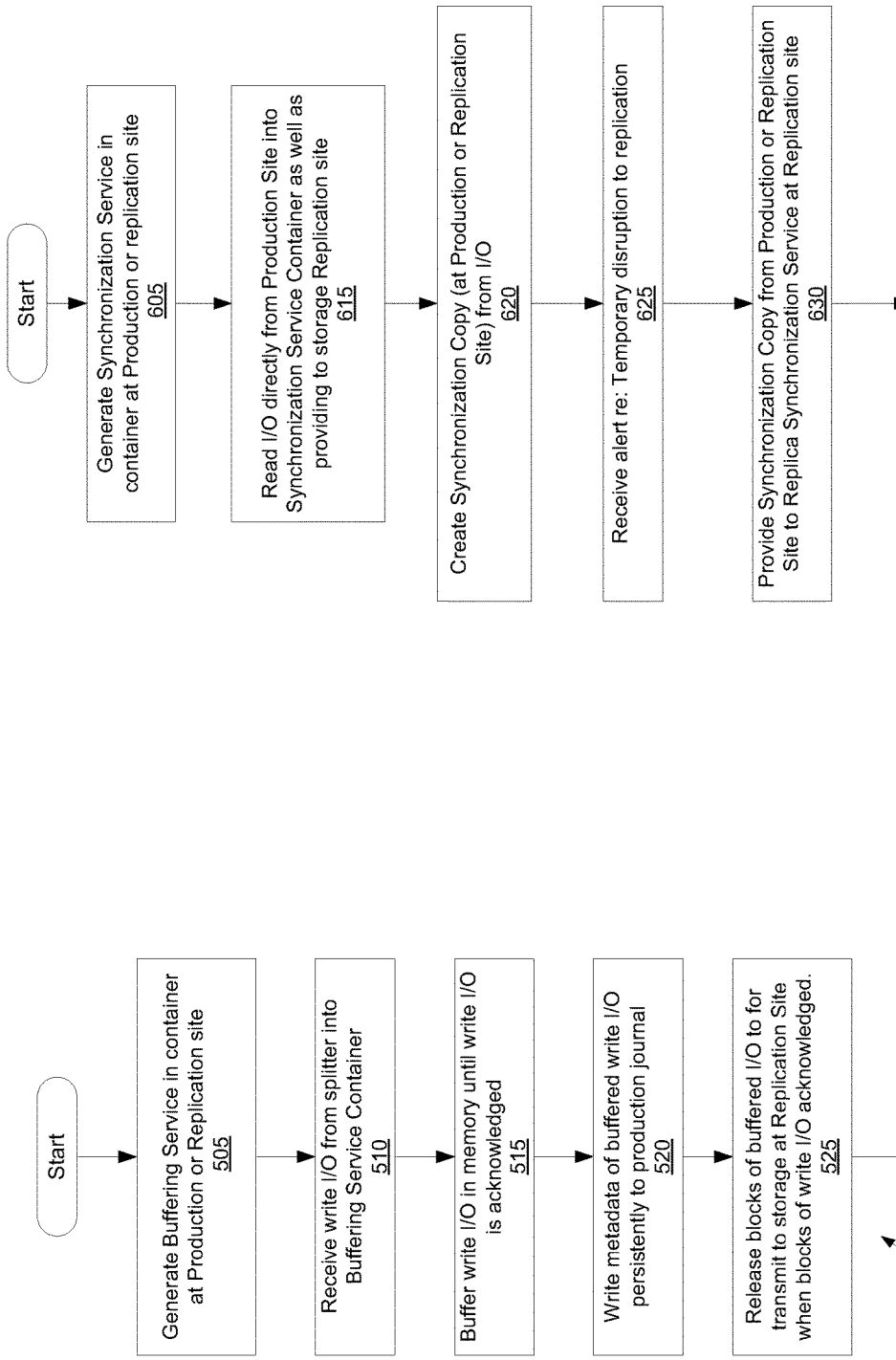

TEMPORAL QUERIES ON SECONDARY STORAGE

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This application relates at least to generally relate to devices, systems, and methods for data storage in computer systems. More particularly, this application relates at least to using containers on secondary storage devices more efficiently run queries and data analysis across points in time.

BACKGROUND

Computer data is vital to today's organizations and a significant part of protection against disasters is focused on data protection. As solid-state memory has advanced to the point where cost of memory has become a relatively insignificant factor, organizations can afford to operate with systems that store and process terabytes of data. Conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

One example of a data protection system is a distributed storage system. A distributed storage system may include a plurality of storage devices (e.g., storage arrays) to provide data storage to a plurality of nodes. The plurality of storage devices and the plurality of nodes may be situated in the same physical location, or in one or more physically remote locations. A distributed storage system may include data protection systems that back up production site data by replicating production site data on a secondary backup storage system. The production site data may be replicated on a periodic basis and/or may be replicated as changes are made to the production site data. Some existing data protection systems may provide continuous data protection, meaning that every change made to data is backed up. Current data protection systems try to provide continuous data protection, which enable the organization to roll back to any specified point in time within a recent history. Continuous data protection typically uses a technology referred to as "journaling," whereby a log is kept of changes made to the backup storage. During a recovery, the journal entries serve as successive "undo" information, enabling rollback of the backup storage to previous points in time.

SUMMARY

This Summary is provided to introduce a selection of concepts in a simplified form, to provide a basic understanding of one or more embodiments that are further described below in the Detailed Description. This Summary is not intended to identify key features or essential features of the claimed subject matter, nor is it intended to be used to limit the scope of the claimed subject matter.

One embodiment provides a storage system, the storage system comprising a processor configured to run an operating system (OS) and a storage array, the storage array comprising a data storage entity storing computer-accessible data and a container executing within the storage array, the container in operable communication with the data storage entity. The container is configured to run a temporal query service configured to query the data storage entity in the storage array from within the storage array, wherein a structure of a temporal query generated in accordance with the temporal query service comprises a query format configured to be compatible with a temporal structure of the data storage entity. The temporal query service is configured to parse at least a first temporal query received from a requesting entity to determine a set of temporal query parameters, the set of temporal query parameters relating to data stored on the data storage entity. The temporal query service also is configured to query the data storage entity with a second temporal query formed in accordance with the set of query parameters and formed to be compatible with a temporal structure of the data storage entity. The temporal query service also is configured to return temporal query results to the requesting entity responsive to the first and second temporal queries, where the temporal query results based at least in part on the set of query parameters.

Details relating to this and other embodiments are described more fully herein.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

FIG. 4A is a diagram of a first architecture showing configuration of an illustrative generic operating system container in accordance with an illustrative embodiment;

FIG. 4B is a diagram of a second architecture showing configuration of illustrative generic application containers, in accordance with an illustrative embodiment;

FIG. 5 is a flow chart of a method for operating a buffering service in a container, in accordance with an illustrative embodiment;

FIG. 6 is a flow chart of a method for operating a synchronization service in a container, in accordance with an illustrative embodiment;

Figure 9:
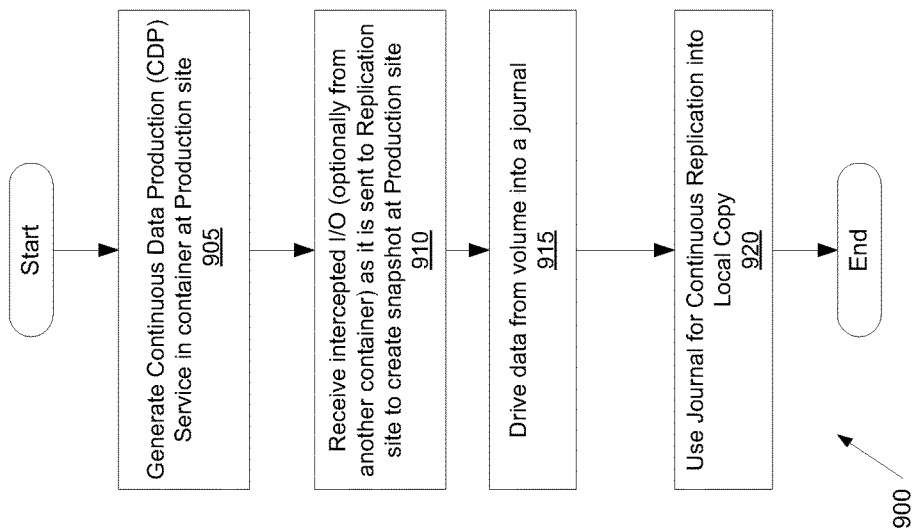
FIG. 9 is a flow chart of a method for operating a continuous data protection (CDP) service in a container, in accordance with an illustrative embodiment.
Figure 10:
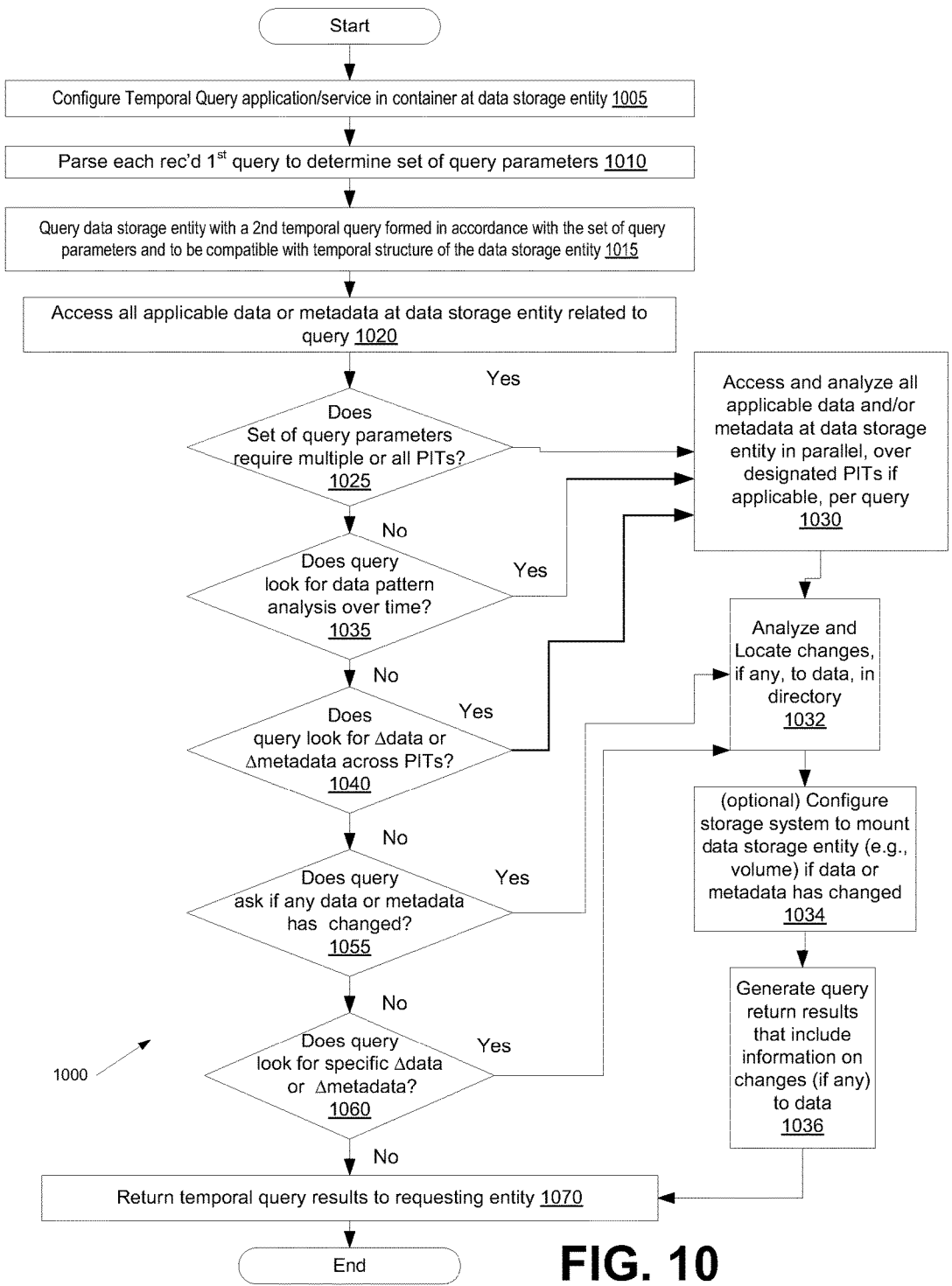
FIG. 10 is a flow chart of a method for operating a temporal query application in a container, in accordance with an illustrative embodiment.
Figure 11:
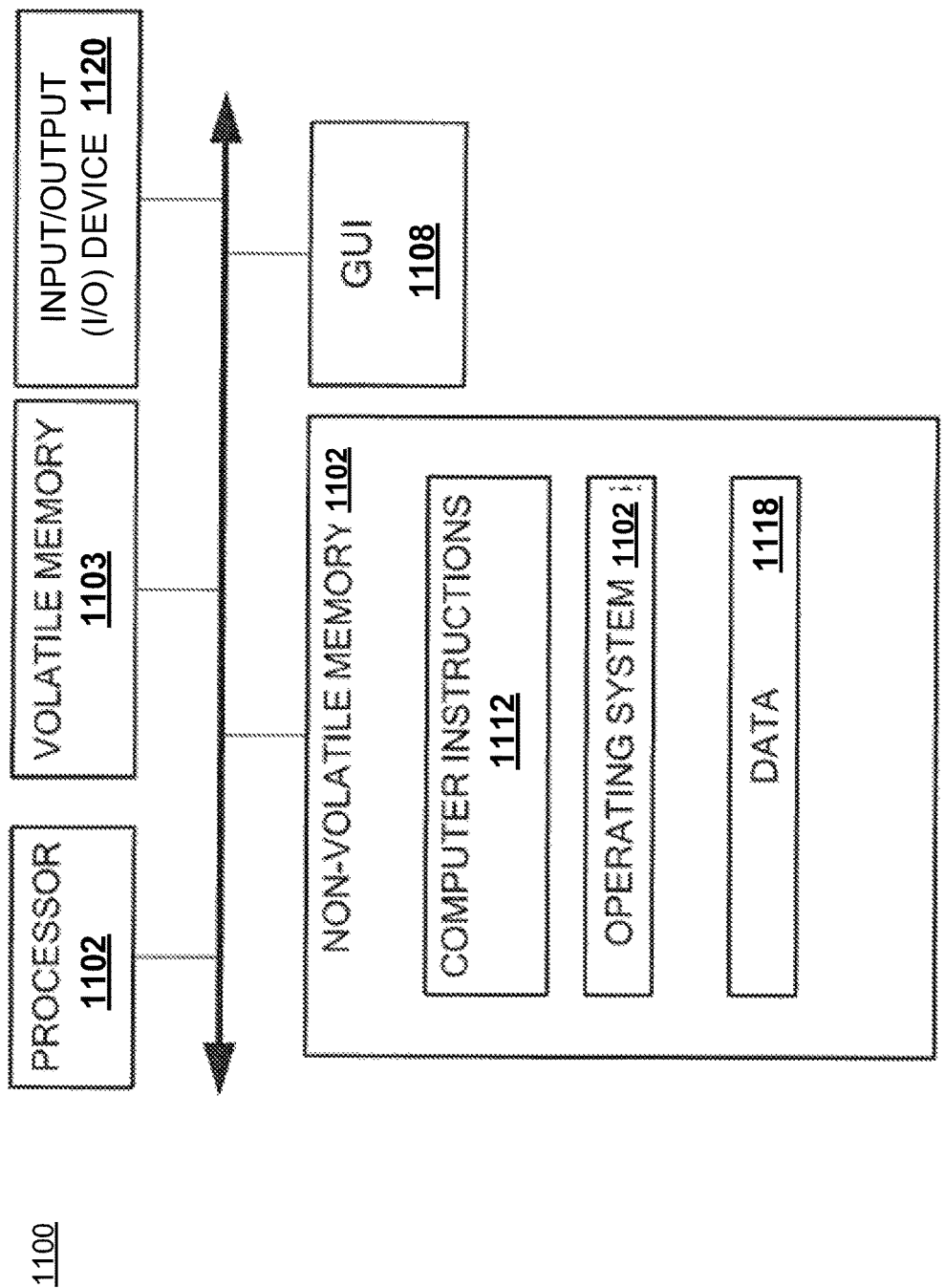
Figure 12:
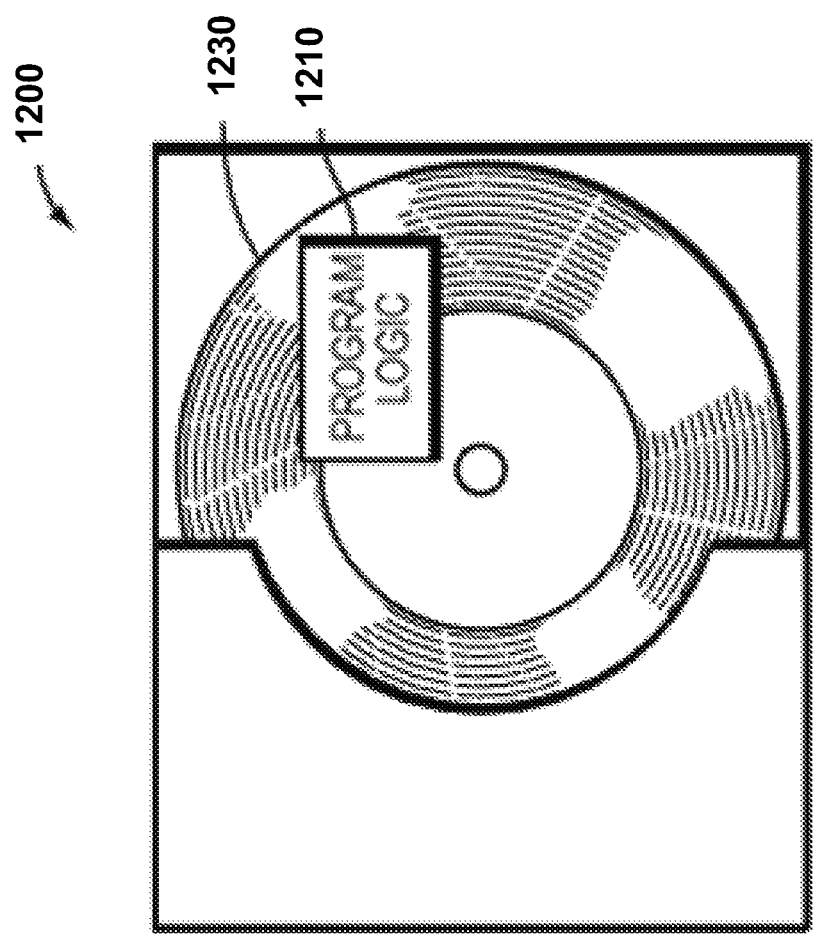

FIG. 11 is a simplified block diagram of an example of an apparatus that may perform at least a portion of the processes and implement at least a portion of the structures, of FIGS. 1-10; and FIG. 12 is a simplified example of an embodiment of a method embodied on a computer readable storage medium that may utilize at least some of the techniques described herein, including at least those described in connection with FIGS. 1-11 herein, in accordance with at least one embodiment of the present disclosure.

DETAILED DESCRIPTION

At least some embodiments of the concepts, structures, and techniques sought to be protected herein are described with reference to a data storage system in the form of a storage system configured to store files, but it should be understood that the principles of the concepts, structures, and techniques sought to be protected herein are not limited to this configuration. Rather, they are applicable at least to any system capable of storing and handling various types of objects, in analog, digital, or other form. Although terms such as document, file, object, etc. may be used by way of example, the principles of the described embodiment are not limited to any particular form of representing and storing data or other information; rather, they are equally applicable at least to any object capable of representing information.

Before describing embodiments of the concepts, structures, and techniques sought to be protected herein, some terms are explained. In particular, the following may be helpful in understanding the specification and claims:

In certain embodiments, the term "I/O request" or simply "I/O" may be used to refer to an input or output request, such as a data read or data write request. In certain embodiments, a SAN may be a storage area network of nodes (also called devices) that send and receive I/O and other requests, each node in the network being an initiator or a target, or both an initiator and a target. In certain embodiments, an initiator may be a node in a SAN that issues I/O requests. In certain embodiments, a target may be a node in a SAN that replies to I/O requests. In certain embodiments, a node can provide at least a processor function. In certain embodiments, a node can include both a processor function and a memory function.

In certain embodiments, replication at least refers to copying/duplicating files and folders from a primary storage (production site) to a secondary storage (replica site), where the copied files are stored as replicas of the original file. In some embodiments, replication involves taking a complete copy of a set of data volumes to a second replica system, which can be at a separate disaster recovery location. Replication can happen at the storage array level, appliance level, host server level, at the file level, or at the replicated copy in the replica system can serve as a complete second copy of the primary data that is usable, for example, if the primary copy fails. This replicated copy also can be used for other functions like disaster recovery testing, load testing, and off-site backup.

In certain embodiments, backup refers at least to copying and/or archiving data, where information preserved by backup can be restored after a storage failure, or just referred back to historical information if necessary. Various types of backups exist, including but not limited to full backup (which includes an exact copy of all data), incremental backup (which includes changes since last backup was taken, where previous backup, full or incremental, is point of reference) and differential (which includes changes since the last full backup was done and which can require having at least one full back up as the point of reference for data restoration.).

In certain embodiments, a host may be at least one computer or networks of computers that runs at least one data processing application that issues I/O requests to one or more storage systems and that can communicate with its corresponding storage system using small computer system interface (SCSI) commands. In some embodiments, a host is an initiator with a SAN, and a host may be a virtual machine. In certain embodiments, a host device may be an internal interface in a host, to a logical storage unit. In certain embodiments, a production site may be a facility where one or more host computers run data processing applications that write data to a storage system and read data from the storage system; may be a virtual or physical site. In certain embodiments, the production site is configured to write data to a primary storage system, which is a storage system (e.g., a storage array) that can be co-located with the production site, or not co-located but in operable communication with the production site, can be in operable communication but disposed in a cloud, etc. Generally, in some embodiments, the primary storage system is configured to be written to by a host device of a production site.

In certain embodiments, a backup site may be a facility where replicated production site data is stored; the backup site may be located in a remote site or at the same location as the production site; a backup site may be a virtual or physical site. In certain embodiments, a back-up site may be an object store. In certain embodiments, the backup site also may be referred to as a replication site. In certain embodiments, the backup site may be configured for holding backup copies of data designed for short-term storage, as well as frequent replacement or update. In certain embodiments, the backup site may be configured as secondary storage intended to hold backup data for longer periods of time, possibly including snapshots of multiple points in time of a given data set. For example, in certain embodiments, the backup site is configured to write received data to a secondary storage system that can be co-located with the backup site, or not co-located but in operable communication with the backup site, can be in operable communication but disposed in a cloud, etc. In some embodiments, the backup site is configured to be written to when the host at a production site writes replicated data.

In some embodiments, secondary storage refers to a type of storage, such as storage configured for long-term storage of data (e.g., for archiving data) and, in some embodiments, for storing multiple points in time (PITs) efficiently. For example, in some embodiments, secondary storage can be configured to store therein a daily backup of a given volume, e.g., a PIT for each day, which can, in some embodiments, be deduped for more efficiency. In some embodiments herein, systems, methods, apparatuses, and techniques are proposed to query secondary sources more efficiently, especially queries related to time aspects of information. In some embodiments, a secondary storage system is configured to be written to when the host at a production site writes replicated data. In some embodiments, the secondary storage system serves as an archive, at one or more points in time, of the original version of the data written to primary storage. Secondary storage, in some embodiments, can serve as a backup target or a replica target. An illustrative example of a backup appliance product usable with at least some embodiments herein is DataDomain, available from DELL EMC Corporation of Hopkinton Mass.

In certain embodiments, an object may represent a logical construct containing data. In some embodiments herein, an object containing metadata may be referred to as a metadata object. In certain embodiments, as used herein, a change object may refer to an object with accumulated I/O. In certain embodiments, an object store (also referred to as object storage) may be a storage architecture that manages data as objects, in contrast to file systems which manage data as a file hierarchy and block storage which manages data as blocks within sectors and tracks. Each object includes the data itself, a variable amount of metadata, and a globally unique identifier, where the object store can be implemented at multiple levels, including the device level (object storage device), the system level, and the interface level. An object store generally references physical locations on a disk. In certain embodiments, a cloud may be an object store. For example, in at least some embodiments, a cloud is an off-premise form of computing that stores data on the Internet.

In certain embodiments, a storage device may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN)). In some embodiments, the term "storage device" may also refer to a storage array including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable, and may also be referred to herein as a computer-readable program medium.

In certain embodiments, a storage system may be a SAN entity that provides multiple logical units for access by multiple SAN initiators, and in some embodiments, the term "storage system" may encompass physical computing systems, cloud or virtual computing systems, or a combination thereof. In certain embodiments, a WAN may be a wide area network that connects local networks and enables them to communicate with one another, such as the Internet. In certain embodiments, a virtual volume may be a volume which is exposed to host by a virtualization layer; the virtual volume may be spanned across more than one site and or volumes. In certain embodiments, a volume may be an identifiable unit of data storage, either physical or virtual; that is, a volume can be a removable hard disk, but is not limited as being a unit that can be physically removed from a computer or storage system.

In certain embodiments, a logical unit (LU) may be a logical entity provided by a storage system for accessing data from the storage system, and as used herein a logical unit is used interchangeably with a logical volume. In many embodiments herein, a LU or LUN (logical unit number) may be used interchangeable for each other. In certain embodiments, a LUN may be a logical unit number for identifying a logical unit; may also refer to one or more virtual disks or virtual LUNs, which may correspond to one or more Virtual Machines. In certain embodiments, a physical storage unit may be a physical entity, such as a disk or an array of disks, for storing data in storage locations that can be accessed by address, where physical storage unit is used interchangeably with physical volume. In certain embodiments, a file system may be a method of cataloging and managing the files and directories on a storage system. In certain embodiments, a data storage entity may be at least any one or more of a file system, object storage, a virtualized device, a logical unit, a logical volume, a logical device, a physical device, and/or a storage medium.

In certain embodiments, a DPA may be Data Protection Appliance a computer or a cluster of computers, or a set of processes that serve as a data protection appliance, responsible for data protection services including, among other things, data replication of a storage system, and journaling of I/O requests issued by a host computer to the storage system. The DPA may be a physical device, a virtual device running, or may be a combination of a virtual and physical device. In most embodiments, a DPA may accumulate I/O and package it into an object. In many embodiments, a DPA may accumulate I/O until a certain or predetermined size, such as one megabyte, is reached. In most embodiments, a DPA may send a data object representing I/O to a cloud. In certain embodiments, an RPA may be replication protection appliance, which may be used interchangeable with and is another name for DPA. In certain embodiments, a RPA may be a virtual DPA or a physical DPA. In certain embodiments, a DPA may track metadata about changes corresponding to I/O in an object.

In certain embodiments, a splitter (also referred to as a protection agent) may be an agent running either on a production host, a switch, or a storage array, or in a network, or at a hypervisor level. A splitter, in certain embodiments, can intercept I/O's and split them to a DPA and to the storage array, fail I/O's, redirect I/O's or do any other manipulation to the I/O's. The splitter or protection agent may be used in both physical and virtual systems. The splitter may be in the I/O stack of a system and may be located in the hypervisor for virtual machines. In some embodiments, I/O sent to a LUN or LU on a production site may be intercepted by a splitter. In many embodiments, a splitter may send a copy of I/O sent to LUN or LU to a data protection appliance or data protection application (DPA). In some embodiments, splitters can be array-based, fabric-based, or host based. In certain embodiments, marking on splitter may be a mode in a splitter where intercepted I/O's are not split to an appliance and the storage, but changes (metadata) are tracked in a list and/or a bitmap and I/O is immediately sent to down the IO stack.

In at least some embodiments, a copy of a LUN or LU may be made, and such copy may include a set of objects, which may represent data on the LUN. In some embodiments, a copy of a LUN may include one or more metadata objects, which may describe how a set of objects representing data of the LUN correspond to or may be used to create the LUN. In at least some embodiments, a copy of a LUN or LU has a set of metadata objects and a set of objects may be sent to a cloud. In certain embodiments, a copy of a LUN or LU as a set of metadata objects and a set of objects may be sent to an object store. In certain embodiments, CRR (continuous remote replication) a may refer to a full replica of a volume or a set of volumes along with a journal which allows any point in time access at a site remote to the production volume and on a separate storage array.

In certain embodiments, a source side may be a transmitter of data within a data replication workflow, during normal operation a production site is the source side; and during data recovery a backup site is the source side; may be a virtual or physical site. In certain embodiments, a target side may be a receiver of data within a data replication workflow. During normal operation a back site is the target side, and during data recovery a production site is the target side. A target site may be a virtual or physical site, and a target site may be referred to herein as a replication site.

In certain embodiments, an image may be a copy of a logical storage unit at a specific point in time. In certain embodiments, a clone may be a copy or clone of the image or images, and/or drive or drives of a first location at a second location. In some embodiments, a clone may be made up of a set of objects. In certain embodiments, a snapshot may refer to differential representations of an image, i.e. the snapshot may have pointers to the original volume, and may point to log volumes for changed locations. Snapshots may be combined into a snapshot array, which may represent different images over a time period. In some embodiments, a snapshot can include a full volume copy, also known as a mirror, clone, or business continuance volume as well as a partial copy, where only changed data, or pointers to changed data, is kept. In certain embodiments, a point in time (PIT) image may be a point-in-time snapshot, such as a copy of a storage volume, file or database as it appeared at a given point in time. In some embodiments, PIT images can be used as method of data protection. A description of methods associated with creating PIT snapshots of a volume may be described in U.S. Pat. No. 8,966,460, entitled "Accessing an Image in a Continuous Data Projection Using Deduplication-Based Storage," which is hereby incorporated by reference.

At least some disclosed embodiments may enable replication to a cloud. At least some embodiments may enable to replication to an object store. At least some embodiments may enable replication to a cloud with an object store. In some embodiments, replication to an object store may include sending objects representing changes to one or more LUNS on a production site to an object store. In many embodiments, an object store may have a copy of a LUN as a set of objects and a set of metadata objects. In these embodiments, as I/O occurs to the LUN, the object store may receive a set of change objects corresponding to the changes written to the LUN. In these embodiments, the object store may receive a set of metadata objects describing the changes to the LUN in the objects. In most of these embodiments, the set of change objects and the set metadata objects may be used as a journal. In most of these embodiments, using the set of metadata objects, one or more portions of the or more of the change objects may be applied to the create new objects to replace the set of objects and the set of metadata objects corresponding to the copy of the LUN. In most of these embodiments, by replacing objects and metadata objects corresponding to the LUN, it may move the copy of the LUN to a future point in time. In some of these embodiments, by keeping the original set of metadata objects and objects, it may be possible to access the original LUN as well as any point in time. In most of these embodiments, by reading the metadata objects describing the set of change objects, multiple points of time may be created on the cloud site. In further embodiments, metadata objects may be created that correspond to information about how to move a new point in time back to a previous point in time.

In certain embodiments, a journal may be a record of write transactions (e.g., I/O data) issued to a storage system, which may be used to maintain a duplicate storage system, and to rollback the duplicate storage system to a previous point in time. In some embodiments, the journal includes a redo log that includes changes that occurred to a production volume and not yet applied to the replica/duplicate, and an undo log having a list of changes that undo the latest changes in the replica/duplicate volume. In some embodiments, each entry in a journal contains, apart from the I/O data itself, I/O metadata that can include information such as a volume identifier (ID), the I/O block offset within the volume, the I/O length, and a time stamp of the I/O.

In certain embodiments, continuous data protection (CDP) refers at least to providing a full replica of a volume or a set of volumes along with a journal which allows any point in time access, the CDP copy generally is at the same site, and maybe the same storage array of the production site. In certain embodiments, CDP captures each I/O from a host and stores it in a secondary repository or other data storage location, which can be accomplished, in some embodiments, using a filter driver that sits on the host, which captures each write written to primary storage and are replicates the write to secondary storage. Copying each and every write can allow the recovery to be very granular, even down to an individual write level, but can consume large amounts of secondary storage capacity. In certain embodiments, CRR: Continuous Remote Replica may refer to providing a full replica of a volume or a set of volumes along with a journal which allows any point in time access at a site remote to the production volume and on a separate storage array.

In certain embodiments, logged access (also known as physical access) may be an access method provided by the appliance and the splitter, in which the appliance rolls the volumes of a consistency group to the point in time the user requested and let the host access the volumes in a copy on first write base. For example, logged access can permit rolling backwards or forwards to a given snapshot (e.g., point in time) for which access is desired. There can be a delay depending on how far the selected point in time is from the snapshot currently being distributed to storage. In some embodiments, when logged access is enabled, hosts in a given SAN can have direct access to replica volumes and, generally, an RPA does not have access—that is, the copying of snapshots from the journal to storage is paused during physical access.

In certain embodiments, virtual access may be an access method provided by the appliance and the splitter, in which the appliance exposes a virtual volume from a specific point in time to the host, where the data for the virtual volume is partially stored on the remote copy and partially stored on the journal. In certain embodiments, virtual access is able to create a desired image of a volume, at a specific point in time, in a separate virtual LUN, in memory, in the cloud. Because the system does not have to roll to the image that is stored in in storage, access can be very fast. Virtual access can be used by entities using or accessing the data in a substantially similar way to physical access. In certain embodiments, in virtual access, the system may create the image selected in a separate virtual LUN within the data protection appliance. While performance may be constrained by the appliance, access to the point-in-time image may be nearly instantaneous. The image may be used for I/O (e.g., reads and writes) in the same way as logged access (physical), noting that data changes (e.g., writes) are temporary and stored in the local journal or local log. In some embodiments, virtual image access may be chosen because the user may not be sure which image, or point in time is needed. The user may access several images to conduct forensics and determine which replica is required.

There may be a number of image access modes. Image access may be used to restore production from a disaster recovery site, and to roll back to a previous state of the data. Image access also may be used to operate a system, temporarily, from a replicated copy while maintenance work is carried out on the production site and to fail over to the replica. When image access is enabled, host applications at the copy site may be able to access the replica.

In many embodiments, a set of virtual machines may be used in the cloud or in the object store. In certain embodiments, a set of virtual machines in a cloud may process metadata objects describing the set of change objects to create a new point in time for a LUN. In many of these certain embodiments, the set of virtual machines may read a set of metadata objects corresponding to the set of change objects to create new objects to replace a set of original objects corresponding to a LUN. In further embodiments, a set of virtual machines may run periodically to create new points in time for an object store or cloud containing changes to a copy of a LUN. In certain embodiments, a virtual machine is created that, for example, accesses a volume at a specific point in time, but is able to access the volume very fast without need for a lot of data movement, thus minimizing consumption of system and network resources.

In at least some embodiments, a container (also referred to as a software container or isolated user space instance) may be a lightweight virtualization instance running under a computer system instance that, in some examples, includes programs, data, and system libraries. In certain embodiments, a container can execute on top of an operating system (OS) and be in operable communication with a data storage entity, such as a file system, object storage, a virtualized device, a logical unit, a logical volume, a logical device, a physical device, and/or a storage medium. When a container is run, the running program for the container (i.e., the process) is isolated from other processes running in the same computer system instance. Thus, several containers may each run on an operating system instance (e.g., using memory, CPU, and storage allocated by the operating system) but each execute in isolation from each other, such that each container may have in isolated view of the file system of the operating system). Containers are different from a virtual machine (VM), which has to simulate hardware. Instead, a container provides a virtual operating system environment that has its own CPU, memory, block I/O, network interface, file system, and IP Address. Software containers such as Linux containers (e.g. LXC containers and Docker containers), permit applications, and their data, to be separated from other applications while running on a computer system. In some embodiments, a container virtualizes the interface between the application and the computing system on which it is executing. Under such an arrangement, the container can regulate any interaction between the application and the computing system or its operating system. Generally, containers differ from virtual machines in that containers virtualize the application instead of the operating system (OS). Thus, containers provide a way to virtualize an OS in order for multiple workloads to run on a single OS instance, whereas with VMs, the underlying hardware is being virtualized to run multiple OS instances.

In some embodiments, a container encapsulation system is a system allows one or more containers to run within a single operating instance without overhead associated with starting and maintaining virtual machines for running separate user space instances. An example container encapsulation system is the Docker container engine.

In some embodiments, high availability (HA) refers both to a system or component that is continuously operational for a desirably long length of time and also to the ability to provide service availability, data availability, and automatic recovery from failures that affect the service or data (such as a network, storage, or server failure).

In certain embodiments, a temporal query refers to a query of a stored data or information source/repository and/or a data storage entity that uses, as one of the query search variables or elements, a unit of time, or an expression of time (e.g., a given date and/or time, or one or more qualifiers that effectively set a particular time, set of times, or time range). For example, in some embodiments, a temporal query is run on information stored in secondary storage, to query for information such as: what changed in each day, did some specific area change, what time was specific data written for the first time, etc. (these query examples are of course exemplary and not limiting). In some embodiments, a temporal query results when a query is created that is run across multiple points in time (PITs), where the query that is generated is formed so as to be aware of the temporal structure of the volume, storage device, or other data storage entity being searched, where the query is formed at least in part based on knowledge of the temporal structure, such that the temporal query can query for changes or query data more efficiently across the PITs. A temporal query, in some embodiments, can have a time based element such requiring or having as a limitation that a searched-for event or piece of data, etc., take place by a predetermined time, take place during or at a predetermined time, or that events take place in a particular sequence or within a set time of another event or events or both.

An exemplary temporal query can search a data source, database, storage array, or any other entity capable of storing information, based on one or more time variable(s) or element(s) in the query. Illustrative examples of temporal queries include, but are not limited to, searching a set of data over a period of time, such as a predetermined period, all periods of time, a single point in time, etc. Temporal queries, as used herein, are not limited merely to searching temporal databases (which at least includes, but is not limited to, databases that store a time series of data, such as by having some fixed timescale (such as seconds or even milliseconds) and then storing only changes in the measured/recorded data). Temporal queries are usable, as noted herein, in any search where the data being searched is time marked or time stamped in some way.

In certain embodiments, a temporal structure of an entity, such as a volume, memory, storage array, storage device, database, data source, data storage entity, etc., refers at least to the manner in which a given entity stores, groups, links, references, orders, and/or makes accessible some or all of its information, especially information that has an association with variables or elements such as time or related to time. In some embodiments, a temporal structure can be used to adding a temporal dimension to a relational model employed by a conventional database systems, such as with an ordered set of units of time, (e.g., time, $t\varepsilon\{0, 1, 2, \ldots, n\}$) that represents the different time points, where each time point can be used to index different images or snapshots or other groups of stored information such that a historical grouping of the information over time can be generated.

For example, if a storage device stores data in format having a timestamp in a particular date, time, day, date, year, format, a temporal query generated based in part on knowledge of the format, may be able to be run more efficiently than temporal queries that are generic and/or not tailored to the entity's temporal structure. In some embodiments, e.g., searches of data structures, temporal structure at least refers, for example, to temporal structure is the method of adding a temporal dimension (e.g., time dimension) to a data storage model (e.g., a snapshot) employed by a data storage entity or data storage system (e.g., the multiple PITs/snapshots of timestamped sets of data that can be found in secondary storage), and can include information that includes, but is not limited to, physical structure of the snapshot, snapshot name, names and associations of data files and log files, timestamp of snapshot creation, etc.

Figure 1:
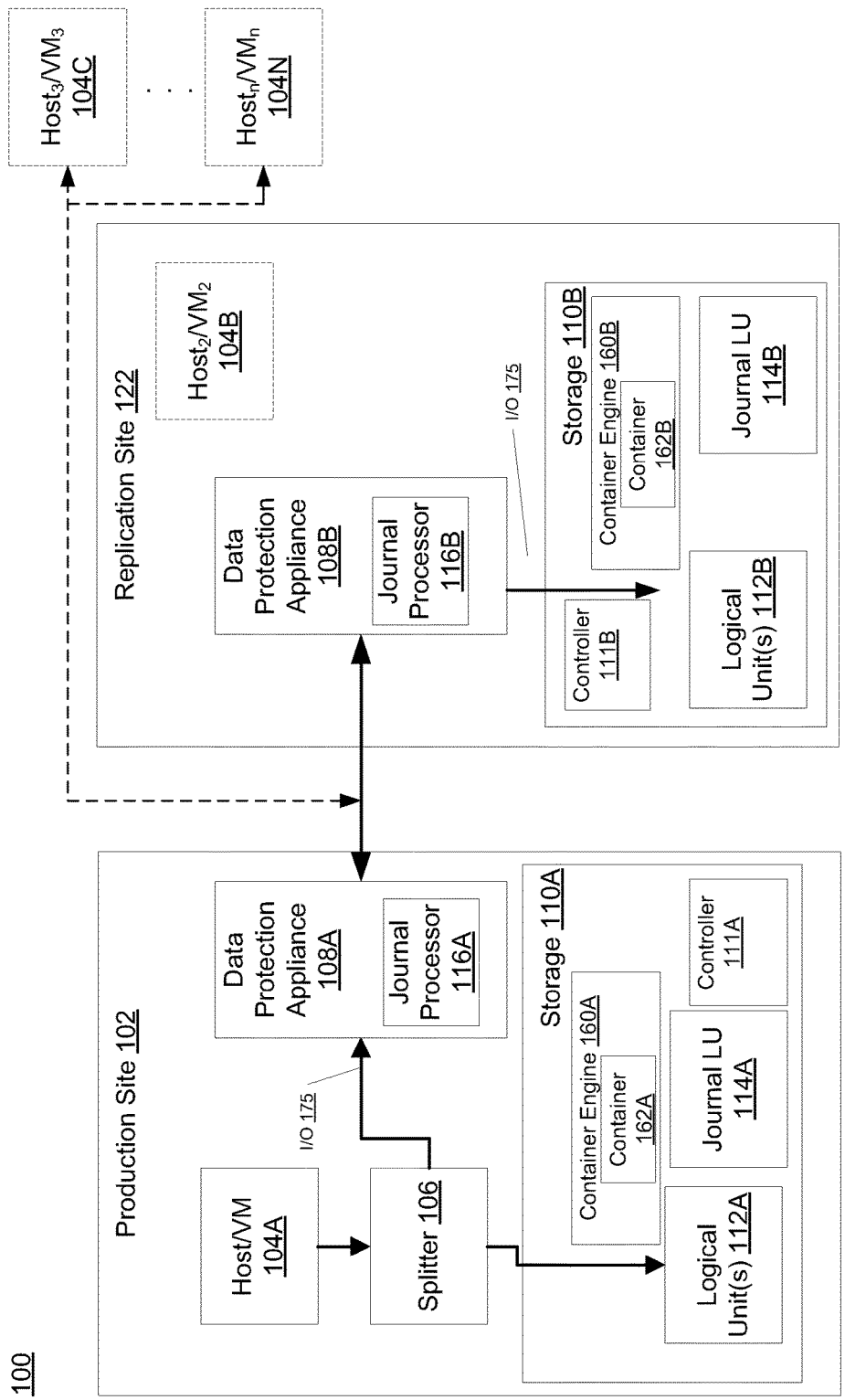
FIG. 1 is a first block diagram of a data protection system, in accordance with at least one illustrative embodiment of the instant disclosure.

Referring to the illustrative embodiment shown in FIG. 1, data protection system 100 may include two sites, production site 102 (which in some embodiments can correspond to a source site) and replication site 122 (which in some embodiments can correspond to a target site and in some embodiments can correspond to secondary storage). Production site 102 may generally be a facility where one or more hosts run data processing applications that write data to a storage system, such as a primary storage system and read data from the storage system. Replication site 122 may generally be a facility where replicated production site data is stored and/or archived, e.g., e.g. a site configured for storing the one or more sets of PIT data stored on a secondary storage system. In such embodiments, production site 102 may back up (e.g., replicate) production data at replication site 122, and the replication site 122 is then configured as secondary storage. Production site 102 has splitter 106, which splits I/O sent to LUN 112A, such as I/O 175, by making a copy of the I/O and sending it to DPA 108A. DPA 108A sends the I/O, such as I/O 175, to DPA 108B on replication site 122. DPA 108B on replication site 122 sends I/O 175 to LUN 112B on Replication site 122. In some embodiments, the DPA 108A manages a journal 116A of the data on the replica site 122, as well as a full copy of the data.

Figure 2:
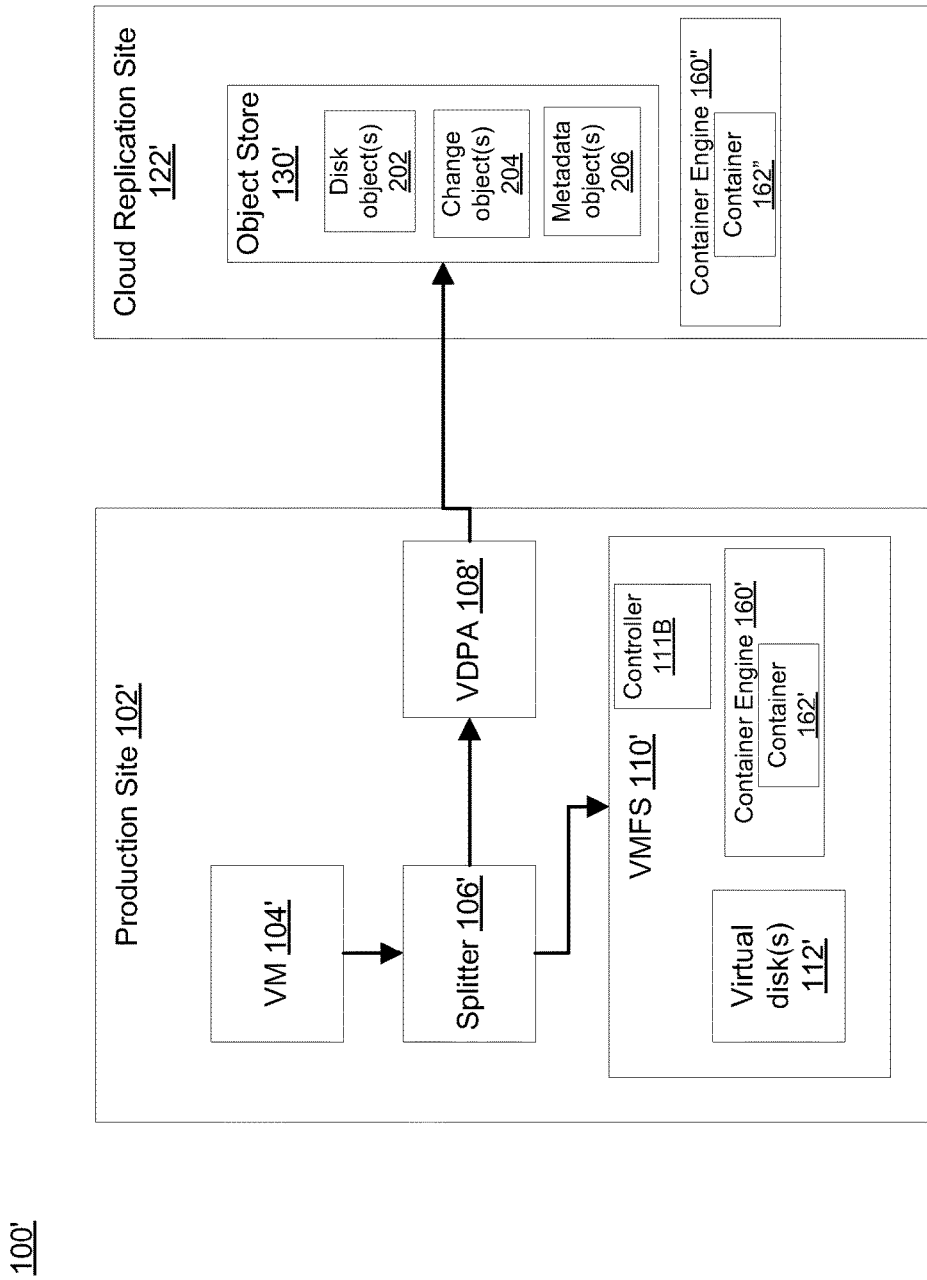
FIG. 2 is a second block diagram of a data protection system, using a cloud, in accordance with at least one illustrative embodiment of the instant disclosure.

Some embodiments of data protection system 100 may be provided as physical systems for the replication of physical LUs, or as virtual systems for the replication of virtual LUs. In certain embodiments, production site 102 and replication site 122 may be remote from one another. For example, as shown in FIG. 2, replication site 122' may be implemented as one or more "virtual" or "cloud" replication sites located remotely from production site 102' and in communication via a WAN or other network link (e.g., the Internet, etc.) (not shown). As will be appreciated, local data protection may have the advantage of minimizing data lag between target and source, and remote data protection may have the advantage of being robust in the event that a disaster occurs at the source site.

Referring again to FIG. 1, replication site 122 may replicate production site data and enable rollback of data of production site 102 to an earlier point in time (PIT). Rollback may be used in the event of data corruption of a disaster, or alternatively in order to view or to access data from an earlier point in time. In some embodiments, replication may be triggered manually (e.g., by a user) or automatically. In certain embodiments, the data protection system 100 may include a failover mode of operation, wherein the direction of replicated data flow is reversed (e.g., where production site 102 may behave as a target site and replication site 122 may behave as a source site.

As shown in FIGS. 1 and 2, production site 102 may include a host (FIG. 1) or virtual machine (VM) (FIG. 2), 104A splitter 106, storage (or storage array) 110A (which in some embodiments serves as part of a primary storage system), and a data protection appliance (DPA) 108A. A host computer may be one computer, or a plurality of computers, or a multiprocessor system, or a network of distributed computers. Each computer may include, among other things, a conventional CPU, volatile and non-volatile memory, a data bus, an I/O interface, a display interface and a network interface (see, e.g., FIG. 11 further herein). In some embodiments, a host computer runs at least one data processing application, such as a database application and an e-mail server. In some embodiments, host 104A may write to a logical unit in storage 110A. In embodiments such as that shown in FIG. 2, VM 104' may write to virtual disk(s) 112' in a virtual machine file system (VMFS) 110'.

Replication site 122 may include DPA 108B and storage 110B (and Object store 130'), where the storage serves as part of a secondary storage system. In some embodiments, hosts 104A, 104b may include one or more devices (or "nodes") that may be designated an "initiator," a "target", or both, coupled by communication links appropriate for data transfer, such as an InfiniBand (IB) link or Fibre Channel (FC) link, and/or a network, such as an Ethernet or Internet (e.g., TCP/IP) network that may employ, for example, the iSCSI protocol. In addition, in at least some embodiments (as further described herein), additional hosts or virtual machines 104C through 104N may be operably coupled to the system 110 (or generated, in the case of virtual machines), as necessary or "on demand", as shown via the dotted lines in FIG. 1. This may be advantageous, for example, should the system of FIG. 1 utilize multi-parallel processing (also known as massively parallel processing) to perform MapReduce and other related processes, as well as any other processes described therein, to more efficiently create or rebuild point in time (PIT) information "on demand," as will be understood.

Referring again to FIG. 1, storage 110A, 110B may include storage devices for storing data, such as disks or arrays of disks, along with a storage controller/processor 111A, 111B. Storage 110A may provide (e.g., expose) one or more logical units (LUs) 112A to which production commands are issued, while storage 110B may provide (e.g., expose) one or more logical units (LUs) 112B to which replication commands are issued. In addition, as further described herein in connection with FIGS. 3-10, in some embodiments, storage 110A and storage 110B can include one or more containers 162, which are illustrated in greater detail in FIGS. 4D and 4E herein and discussed more fully below, in connection with FIGS. 3-10.

Figure 3:
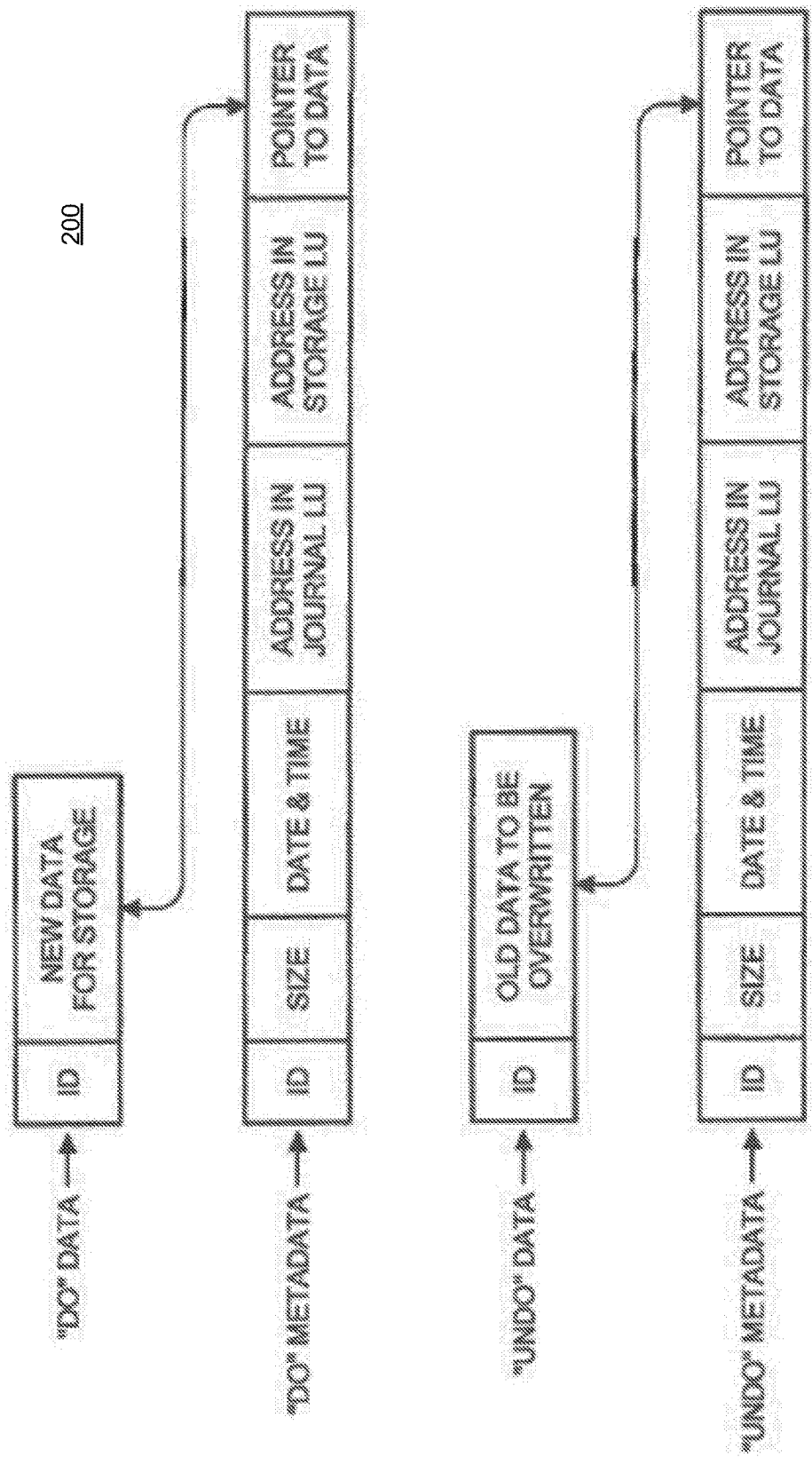
FIG. 3 is a diagram illustrating a journal history of write transactions for the data protection systems of FIGS. 1 and 2, in accordance with at least one illustrative embodiment of the instant disclosure.

Storage system 110A may expose a journal LU 114A for maintaining a history of write transactions made to LU 112A, referred to herein as a "journal." In some embodiments, a journal may be used to provide access to storage at specified points-in-time (PITs), as discussed in greater detail in regard to FIG. 3. In some embodiments, the journal may be stored across multiple LUs (e.g., using striping, etc.). In some embodiments, DPA 108A may include a journal processor 116A for managing the journal within journal LU 114A. In some embodiments, journal processor 116A may manage the journal entries of LU 112A. Specifically, in some embodiments, journal processor 116A may enter write transactions received by DPA 108A from the replication site DPA 108B into the journal by writing them into journal LU 114A, read the undo information for the transaction from LU 112A, update the journal entries in journal LU 114A with undo information, apply the journal transactions to LU 112A, and remove already-applied transactions from the journal. In one embodiment, journal processor 115A may perform processing such as described in the patent titled "Methods and Apparatus for Optimal Journaling for Continuous Data Replication" and with U.S. Pat. No. 7,516,287, issued Apr. 7, 2009, which is hereby incorporated by reference.

In some embodiments, a snapshot replica may be a differential representation of a volume. For example, the snapshot may include pointers to the original volume, and may point to log volumes for locations of the original volume that store data changed by one or more I/O requests. In some embodiments, snapshots may be combined into a snapshot array, which may represent different images over a time period (e.g., for multiple PITs).

In some embodiments, DPA 108A and DPA 108B may perform various data protection services, such as data replication of storage system 100, and journaling of I/O requests issued by device 104. DPA 108A and DPA 108B may also enable rollback of production data in storage 110A to an earlier point-in-time (PIT) from replica data stored in storage 110B, and enable processing of rolled back data at the target site. In some embodiments, rollback may be used in the event of data corruption of a disaster, or alternatively in order to view or to access data from an earlier point in time. In some embodiments, each of DPA 108A/108B may be a physical device, a virtual device, or may be a combination of a virtual and physical device.

In the architecture illustrated in FIG. 1, DPA 108A and DPA 108B are standalone devices integrated within a SAN. Alternatively, each of DPA 108A and DPA 108B may be integrated into storage system 110A and storage system 110B, respectively, or integrated into host computer 104A or 104B (as well as any other component or computer at replication site 122). Both DPA's communicate with their respective host computers through communication lines such as fiber channels using, for example, SCSI commands, or any other protocol.

In some embodiments, DPA 108A may receive commands (e.g., SCSI commands) issued by device 104A to LUs 112A. For example, splitter 106 may intercept commands from device 104A, and provide the commands to storage 110A and also to DPA 108A. In some embodiments, the splitter 106 may intercept data operations at several logical levels. In some embodiments, the splitter 106 helps in replication of block level devices and intercepts I/O at the SCSI layer. In some embodiments, splitter 106 may act on intercepted SCSI commands issued to a logical unit in one of the following ways: send the SCSI commands to its intended LU; redirect the SCSI command to another LU; split the SCSI command by sending it first to DPA 108A and, after DPA 108A returns an acknowledgement, send the SCSI command to its intended LU; fail a SCSI command by returning an error return code; and delay a SCSI command by not returning an acknowledgement to the respective host. In some embodiments, splitter 106 may handle different SCSI commands, differently, according to the type of the command. For example, in some embodiments, a SCSI command inquiring about the size of a certain LU may be sent directly to that LU, whereas a SCSI write command may be split and sent to DPA 108A.

In certain embodiments, splitter 106 and DPA 108B may be drivers located in respective host devices of production site 102 and replication site 122. Alternatively, in some embodiments, a protection agent may be located in a fiber channel switch, or in any other device situated in a data path between host/VM 104A and storage 110A. In a virtualized environment, the protection agent may run at the hypervisor layer or in a virtual machine providing a virtualization layer. For example, in such embodiments, a hypervisor may consume LUs and may generate a distributed file system on the logical units such as Virtual Machine File System (VMFS) that may generate files in the file system and expose the files as LUs to the virtual machines (each virtual machine disk is seen as a SCSI device by virtual hosts). In another embodiment, a hypervisor may consume a network based file system and exposes files in the Network File System (NFS) as SCSI devices to virtual hosts.

In some embodiments, production DPA 108A may send its write transactions to replication DPA 108B using a variety of modes of transmission, such as continuous replication or snapshot replication. For example, in continuous replication, production DPA 108A may send each write transaction to storage 110A and also send each write transaction to replication DPA 108B to be replicated on storage 110B. In snapshot replication, production DPA 108A may receive several I/O requests and combine them into an aggregate "snapshot" or "batch" of write activity performed to storage 110A in the multiple I/O requests, and may send the snapshot to replication DPA 108B for journaling and incorporation in target storage system 110B. In such embodiments, a snapshot replica may be a differential representation of a volume. For example, the snapshot may include pointers to the original volume, and may point to log volumes for locations of the original volume that store data changed by one or more I/O requests. In some embodiments, snapshots may be combined into a snapshot array, which may represent different images over a time period (e.g., for multiple PITs).

As shown in FIG. 2, in some embodiments, a copy of a LUN or LU may be stored in an object store (e.g., object store 130' of FIG. 2) of replication site 122'. Object store 130' may include a set of objects 202, 204, 206, that may represent data of the LUN. For example, in some embodiments, object store 130' may include one or more disk objects 202, one or more change objects 204, and one or more metadata objects 206. Disk objects 202 may include data stored in the LUN and can be associated with data stored in a copy of an LU or virtual disk at a point in time of the production site. As will be described, change objects may represent changes to data of the LUN over time. For example, in some embodiments, change objects can be associated with one or more input/output (I/O) operations on the production site. Metadata objects 206 may describe how a set of objects representing data of the LUN correspond to or may be used to create the LUN. In some embodiments, metadata objects are associated with the change object. In some embodiments, metadata objects 206 themselves include content such as a volume identifier (ID), an I/O block offset within a volume, an I/O length, and a time stamp of the I/O. In some embodiments, object store 200 may be in a cloud replication site. Replication may include sending objects representing changes to one or more LUNs on production site 102 to the replication site.

Referring again to FIGS. 1 and 2, input/output (I/O) requests sent to a LUN or LU (e.g., 112A) on a production site (e.g., 102) may be intercepted by a splitter (e.g., 106, 106'). The splitter may send a copy of the I/O to a DPA (e.g., DPA 108A, 108B, VDPA 108'). The DPA may accumulate multiple I/O's into an object (e.g., disk objects 202). A change object (e.g., change objects 204) may refer to an object with accumulated I/O where each I/O may change data in the disk objects. The DPA may accumulate I/O until a certain size is reached, and may then send disk object(s) and change objects representing the accumulated I/O to a cloud replication site (e.g., 122') that may include an object store (e.g., 130'). In some embodiments, DPA 108A may track metadata about changes corresponding to accumulated I/O in an object as metadata objects 206. DPA 108A may send metadata objects to a cloud or an object store when the metadata object reaches a certain size. In some embodiments, DPA 108A may package the disk objects, change objects and metadata objects into an object to send to a cloud replication site.

In at least some described embodiments, as I/O occurs to the production site LUN, object store 130' may receive a set of change objects corresponding to the changes written to the LUN. In these embodiments, the object store 130' may receive a set of metadata objects describing the changes to the LUN in the objects. Thus, the set of change objects and the set of metadata objects may be used as a journal. In such embodiments, the metadata objects and one or more portions of the change objects may be used to create new disk objects to move the copy of the LUN to a different point in time. For example, by keeping the original set of metadata objects and objects, it may be possible to access the original LUN and any point in time (PIT). By reading the metadata objects describing the set of change objects, multiple PITs may be created on the cloud replication site. In some embodiments, objects and metadata may be maintained to provide a protection window of storage system 100. For example, a protection window may correspond to a time period during which changes to a LUN are tracked. Objects and metadata objects that correspond to a PIT outside of a protection window may be deleted.

In some embodiments, one or more virtual machines may be used in the cloud or in the object store to process disk objects, change objects, and metadata objects describing the change objects to create and/or rebuild a new PIT for a LUN. For example, the virtual machines may create new metadata objects to describe the LUN at a future point in time, where the new metadata objects may reference some of the original disk objects corresponding to the LUN and new objects that replace one or more of the original objects corresponding to the LUN.

In some embodiments, the virtual machines may be created (e.g., brought up) and run periodically to process change objects and metadata objects and/or to create new PITs for an object store or cloud containing changes to a copy of a LUN. In some embodiments, if virtual machines operate periodically, there may not be a need to use compute power in the cloud (e.g., at the replication site) other than when the virtual machines are running. The virtual machines may process a set of change objects and a set of metadata objects to create a journal to enable a PIT to be rolled forward or backward in time. In some embodiments, the journal may be represented by a set of objects.

As described herein, a set of change objects that contain change data, and a set of metadata objects describing the change data may enable recovering or recreating the production site LUN from the replica data if a failure occurs on the production site.

At least some described embodiments may perform cloud recovery to multiple points in time (PITs). As described herein, storage system 100 may generate multiple snapshots of the replica copy of the LUN, each snapshot corresponding to a different PIT. Each snapshot may include one or more objects (e.g., as shown in FIG. 2) associated with LUNs of the snapshot. The objects may be used by replication site 122 to create a journal. By applying a portion of the journal (e.g., change objects) to disk data objects, multiple PITs may be recovered.

FIG. 3 is a diagram illustrating a journal history of write transactions for the data protection systems of FIGS. 1 and 2, in accordance with at least one illustrative embodiment of the instant disclosure. Referring to FIG. 3, in some described embodiments, a write transaction 200 may be included within a journal and stored within a journal LU. In some embodiments, write transaction 200 may include one or more identifiers and a time stamp indicating the date and time at which the transaction was received by the source DPA. In some embodiments, write transaction 200 also includes a write size indicating the size of the data block; a location in the journal LU where the data is entered; a location in the target LU where the data is to be written; and the data itself.

Referring to FIGS. 1, 2 and 3, in some embodiments, transaction 200 may correspond to a transaction transmitted from production DPA 108A to replication DPA 108B. In some embodiments, production DPA 108A may record write transaction 200 in the journal that includes four streams. In some embodiments, a first stream, referred to as a "DO" stream, includes a copy of the new data for writing to LU 112A. In some embodiments, a second stream, referred to as a "DO METADATA" stream, includes metadata for the write transaction, such as an identifier, a date and time, a write size, the offset within LU 112A where the new data is written, and a pointer to the offset in the DO stream where the corresponding data is located. In some embodiments, a third stream, referred to as an "UNDO" stream, includes a copy of the data being overwritten within LU 112A (referred to herein as the "old" data). In some embodiments, a fourth stream, referred to as an "UNDO METADATA" stream, includes an identifier, a date and time, a write size, a beginning address in LU 112A where data was (or will be) overwritten, and a pointer to the offset in the UNDO stream where the corresponding old data is located.

In some embodiments, since the journal contains the "undo" information necessary to rollback storage system 100, data that was stored in specific memory locations at a specified point in time may be obtained by undoing write transactions that occurred subsequent to such point in time (PIT). In some embodiments, each of the four streams may hold a plurality of write transaction data. In some embodiments, as write transactions are received dynamically by the target DPA, the write transactions may be recorded at the end of the DO stream and the end of the DO METADATA stream, prior to committing the transaction. In some embodiments, a metadata stream (e.g., UNDO METADATA stream or the DO METADATA stream) and the corresponding data stream (e.g., UNDO stream or DO stream) may be kept in a single stream by interleaving metadata and data.

Having described a data protection system and journal history configuration in which at least some embodiments may be embodied, further details will now be described of at least some embodiments related improving the speed and efficiency of many of these and other processes, via use of containers implemented directly in the storage arrays at either or both of the production side and replication side. Although the following disclosure and certain example embodiments are described in connection with their use with data centers, DPAs, RPAs, hosts, SANs, LUNs, etc., it will be appreciated that the disclosures and embodiments herein are not limited to these applications, but can find applicability in virtually any type of computer system.

Replication systems today can be divided into two groups: external (e.g., appliance based) and internal storage native replication. Each group has its advantages and disadvantages.

External replication systems (like EMC RECOVERPOINT, available from DELL EMC of Hopkinton, Mass.) can be very generic and support large verity of configurations and storage arrays. External replication systems may have small portions of their actions that happen in an array, but most of the operations take place outside the array. Because external replication systems run on dedicated hardware, their overhead on the storage array is relatively low. External replication systems can allow true out of band asynchronous replication that has zero data loss if there is a production array storage failure. However, such external replication systems can produce a lot of workload on the production and secondary arrays and can therefore require a lot of bandwidth and expensive communication infrastructure in the datacenter.

Internal replication systems, also referred as storage native replication, run inside the storage array and use its hardware. An example of an internal replication systems is SYMMETRIX, available from DELL EMC CORPORATION of Hopkinton Mass. These kinds of replication systems can be array specific and are not portable between different solutions. But, unlike the external replication systems, internal replication solutions don't overload the communication infrastructure and are more efficient as such systems don't need to use the front-end interfaces of the array.

In at least some embodiments herein, a new type of replication system is proposed that can gain and provide most of the advantages of both external replication systems and native replication systems. In at least some embodiments, this new type of replication system uses generic containers capabilities configured into a storage array, especially (in some embodiments), storage arrays configured as part of secondary storage. In some embodiments, configuring one or more generic containers as part of a storage array can provide advantages of external replication systems, such as low overhead on storage array, zero data loss in case of production array storage failure, and allowing out of band asynchronous replication. In some embodiments, configuring one or more generic containers as part of a storage array can provide advantages of advantages of internal replication systems, including but not limited to reducing the overload on the communications infrastructure in which the storage array operates and providing greater efficiency in various operations, especially those related to storage array functions. In some embodiments, configuring one or more generic containers as part of a storage array configured as secondary storage provides advantages in improving the efficiency, ease, and speed of searching the secondary storage for particular temporal query based information.

As is known, a container can be a software process that provides an isolated user space execution context within an operating system, where different containers can run on the same kernel and can communicate with each other using inter-process communication (IPC) mediated by the kernel. In particular, containers effectively are a form of operating system virtualization. Containers can provide a lightweight virtual environment that groups and isolates a set of processes (e.g., applications and services) and resources such as memory, CPU, disk, etc., from the host and any other containers. The isolation helps ensure that any processes inside the container cannot see any processes or resources outside the container. Containers are sometimes thought of as lightweight virtual machines, but containers are unlike virtual machines because virtual machines provide a hardware virtualization, including contains an application and whatever is needed to run that application (e.g. system binaries and libraries), as well as an entire virtualized hardware stack of its own, including virtualized network adapters, storage, and CPU—which means a virtual machine also has its own full-fledged operating system. In some instances, certain types of storage arrays (e.g., the VMAX storage array manufactured by DELL EMC) are able to support running virtual machines inside a storage array, on a proprietary hypervisor. However, use of containers provides even greater speed and portability advantages, as described further herein.

In contrast, containers share a host system's kernel with other containers, making containers not only more lightweight, but also significantly more portable and flexible. For example, in some embodiments, containers can be created much faster than virtual machines because VMs often must retrieve 10-20 GBs of an operating system from storage as part of their creation process; in contrast, the workload in the container uses the host server's operating system kernel, avoiding that step, enabling containers to boot up and run much, much faster. In addition, being lightweight, fast, and portable helps provide particular advantages when containers are configured to be part of a storage device, array, or system, as described in at least some embodiments herein. Another advantage of containers is predictability: a given host does not care about what is running inside of the container and the container does not care about which host it is running on, with standard interfaces and interactions, helping to increase portability as well.

Use of containers, as described in at least some embodiments herein, provides an ability, in some embodiments, to access one or more storage device components and operations directly from inside the storage device, which can improve speed and efficiency of many operations. Adding containers directly into storage provides access to methodologies and services which allows building complex data services running at the storage device, using the container. This enables a much more efficient replication engine, which is also very portable, and which can communicate externally, including between multiple storage arrays. For example, in some embodiments, using a container in a storage array also can provide some basic mechanisms like I/O control, including allowing a container to run services that intercept I/O, get copies of I/O, control I/O, provide I/O to other devices, terminate I/O, etc. In some embodiments, from a container provided and configured on a storage array, it also is possible to access the volumes on the storage array more directly and quicker, permitting a container at the storage array to control read and write to any volumes over which a given container has control. Containers also can be configured, in accordance with some embodiments described herein, to dynamically enhance storage device capabilities and features, especially because of the proximity (low latency) of the containers to the data—using containers, as described in some embodiments herein, can have significant advantages in conducting various types of searches of data stored on an array.

Figure 4C:
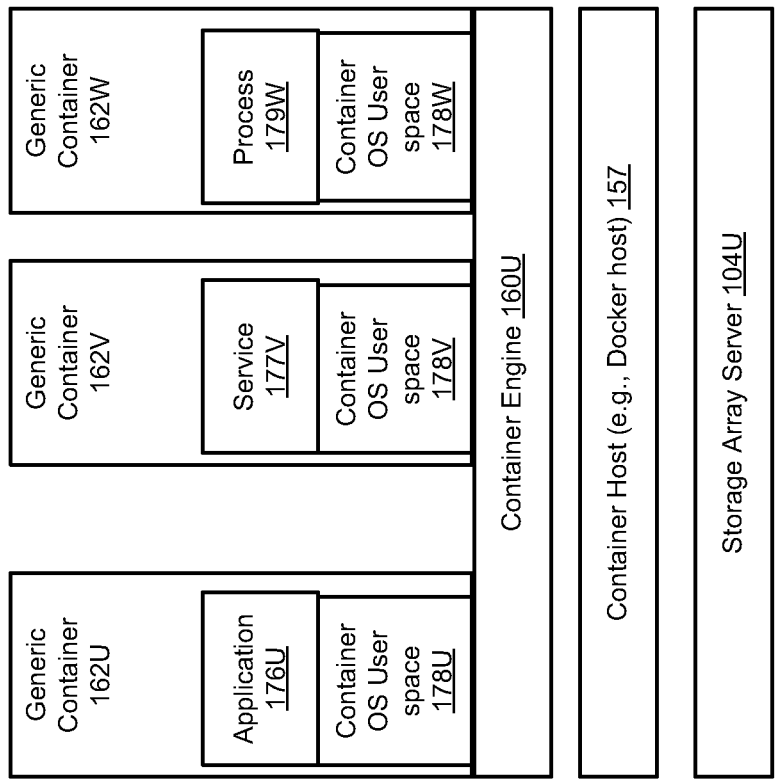
FIG. 4C is a diagram of a third architecture showing configuration of illustrative generic application containers, in accordance with an illustrative embodiment.

There are different container implementations that are usable with at least some of the embodiments herein. In fact, the embodiments herein are applicable to any type of container. For example, some types of containers are known as OS or system containers, where such containers are virtual environments that share the kernel of the host operating system but provide user space isolation, and which are designed to run multiple processes and services within the same container. Other types of containers are application containers, which are designed to package and run a single application or service (in contrast with the OS containers, which are designed to run multiple processes and services). FIG. 4A is a diagram of a first architecture 400A showing configuration of an illustrative generic operating system container 162P that is usable at least in the systems of FIGS. 1 and 2, as well as in at least some disclosed embodiments. FIG. 4B is a diagram of a second architecture 400B showing configuration of illustrative generic application containers 162R-162T, in accordance with an illustrative embodiment. FIG. 4C is a diagram of a third architecture 400C showing configuration of illustrative generic application containers 162U-162V, in accordance with an illustrative embodiment.

The architecture 400A of FIG. 4A shows that the generic operating system container 162P sits in a layer running on top of a container engine layer 160P (described further below), which itself runs on top of a host operating system 158 layer, (which can, by way of example and not limitation, include operating systems such as LINUX and WINDOWS), which itself runs on a computing device 104, such as a server 104 of a storage array (or other host). Although FIG. 4A only shows a single generic container 162P, the container 162P effectively gets its own isolated user space 178P as well as an I/O stack 170 (e.g., in some embodiments, as part of the container OS user space 178P that is created), an application 176P, and a service 177P. Multiple OS containers 162P (only one is illustrated in FIG. 4A) are able to run on top of the operating system container engine layer 160P. In FIG. 4A, the operating system container 162P also is able to share the OS 158P across other containers (not shown). There are various OS containers 162P in the market that either are directly usable or can be readily adapted to be usable with the embodiments described herein, including, but not limited to SOLARIS ZONES and LINUX LXC.

FIG. 4B illustrates an architecture 400B that uses a plurality of generic containers 162R-162T, relating to applications, services, and/or processes. Each application container 162R-162T includes its own respective user space 178R-178T, and each runs a distinct application 176R, service 177R, or other process 179R (examples of these applications, services, and process are described more fully herein). Similar to the configuration of FIG. 4A, the architecture 400B of FIG. 4B has the generic containers 162R-162T running on top of a container engine layer 160R, which runs on top of a host system layer 158R, which itself runs on a host 104R, which can, in some embodiments, be a server running a storage array (e.g. storage array 110). Application, service, and process containers like those in FIG. 4B are flexible enough such that the any one of them could be configured to be even run an OS. Vendors of application containers usable with at least some embodiments herein include (but are not limited to), Docker, Sandstorm, Carina, IBM Bluemix, Nexenta, etc.

FIG. 4C illustrates an architecture 400C that uses a plurality of generic containers 162U-162W, relating to applications, services, and/or processes. FIG. 4C is substantially similar to FIG. 4B, except that, instead of running on an underlying Host OA 158R, as is shown in FIG. 4B, in FIG. 4C, the containers 162U-162W run on a container specific host 157 (e.g., Docker host), that does not have an underlying OS.

In at least some embodiments herein, this container's capabilities can be leveraged and adapted to run one or more generic replication services inside the array. For example, these replication services can be, in some embodiments, production side services that run on a production array (e.g., production site 102 of FIG. 1), or copy side services that run on a secondary array (e.g., replication site 122). These are discussed more fully herein.

Figure 4D:
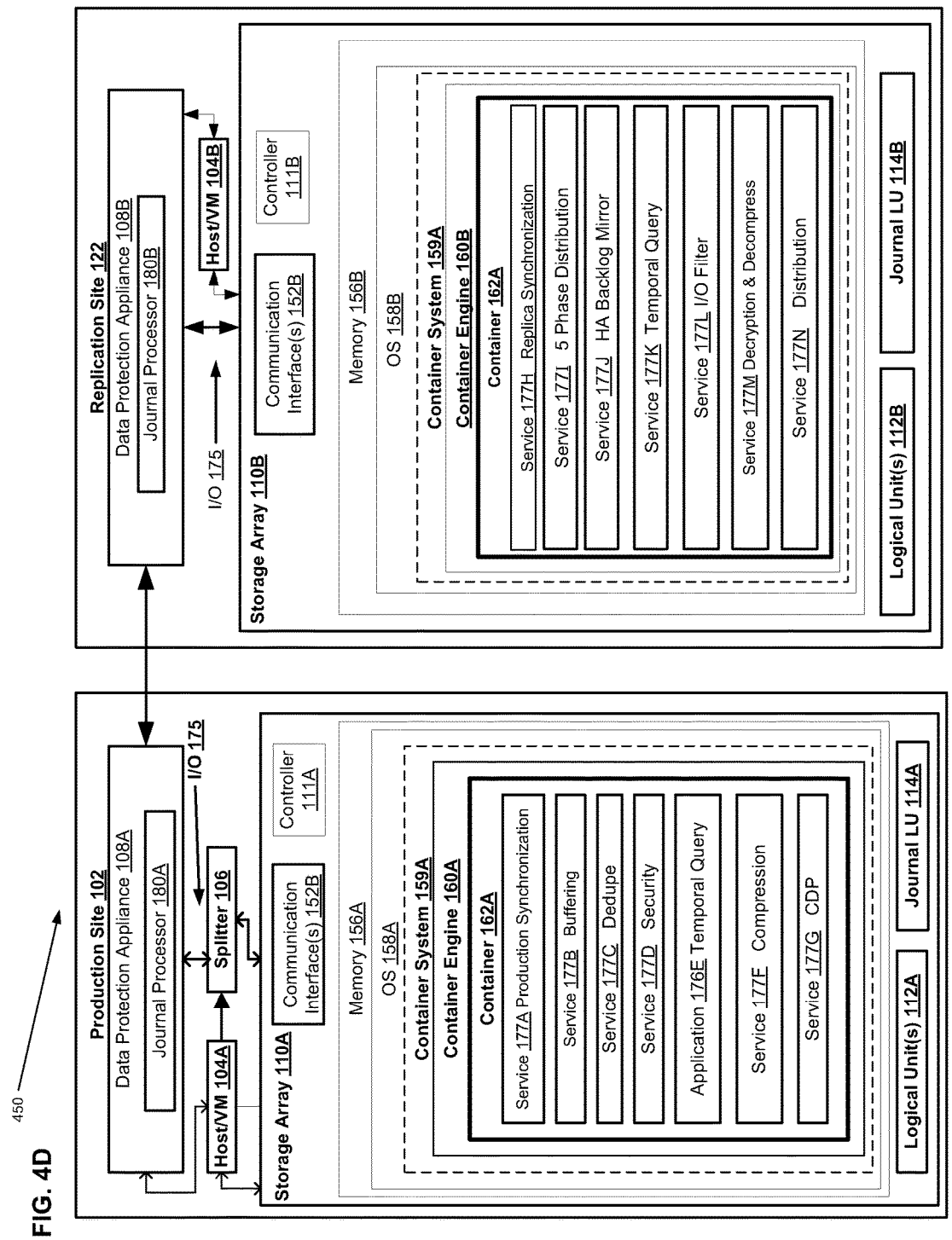
FIG. 4D is a first illustrative system block diagram showing an interconnected production site and replication site, each having a respective one or more containers operating within a respective storage array, in accordance with an illustrative embodiment.
Figure 4E:
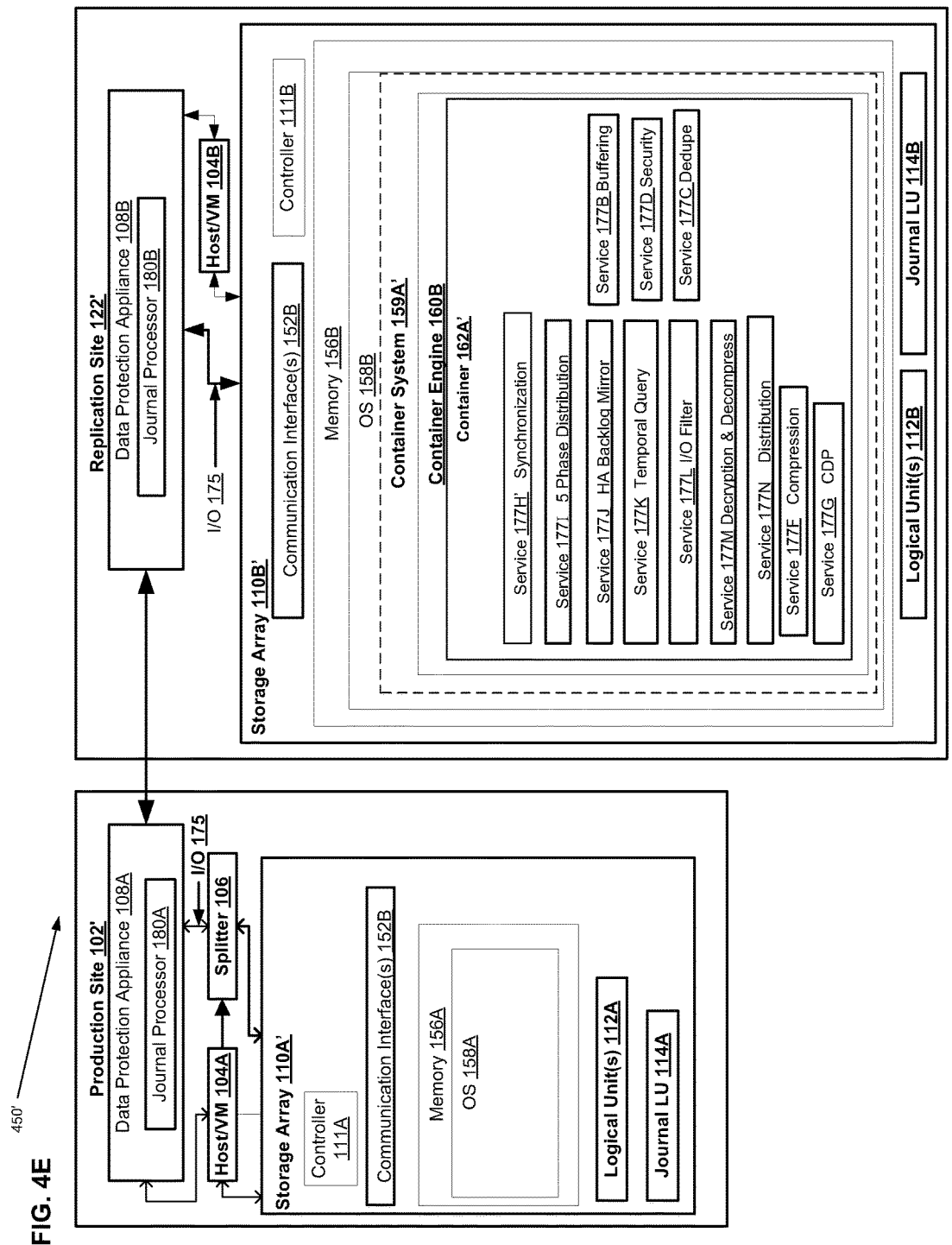
FIG. 4E is a second illustrative system block diagram showing an interconnected production site and replication site, wherein only the replication site has one or more containers operating within a respective storage array, in accordance with an illustrative embodiment.

FIG. 4D is an illustrative system block diagram 450 showing an interconnected production site 102 and replication site 122, each having a respective plurality of containers 162 running within each respective storage array, in accordance with an illustrative embodiment. The system of FIG. 4D is a more detailed version of the system depicted in FIG. 1, but shares a lot of similar components (e.g., the DPAs 108, Host/VM 104, splitter 106, journal processors 180, LU's 112, and Journal LU's 114, whose functions are not repeated here. It should be noted, however, that the LU 112, in some embodiments, can be any type of data storage entity described herein (e.g., at last any one or more of a file system, object storage, a virtualized device, a logical unit, a logical volume, a logical device, a physical device, and/or a storage medium); the use of an LU for component 112 in the figures herein is illustrative and not intended as limiting. FIG. 4E is an illustrative system block diagram 450' showing an interconnected production site 102' and replication site 122', where the replication site 122' is configured as a secondary storage for production site 102'. The containers are provided only at the secondary storage (replication site 122'). Otherwise, the system block diagram 450' is generally very similar to the system block diagram 450 of FIG. 4D.

Referring to FIGS. 4D and 4E, in accordance with at least some embodiments, one (FIG. 4E) or all (FIG. 4D) of the storage arrays 110A, 110B, 110B' are each configured to include, not only an LU 112 and journal LU 114, but also components usable to run at least one container system 159 (consisting of a container engine 160, container 162, and one or more container services 176 and/or container applications 177). Each storage array 110 includes a communications interface 152 configured to enable the storage array 110 to communicate with other components and is in operable communication with one or more processing units 104, which are processors that run the host OS 158 running on the storage array (these processing units can, in some embodiments, be the same as the host/VM 104 that is configured for use on the respective production site 102 or replication site 122 (FIG. 4D), 122' (FIG. 4E)). In at least some embodiments, the functionality of the processor of the Host/VM 104 can be partially implemented in the storage array 110 itself and/or in the container system 159A, such that the containers 162 help to implement some or all of the functionality of the storage array 110.

The container system 159 includes a container engine 160 and at least one container 162 running at least one application 176 or service 177. The container engine 160 hosts one or more containers 162 and the container engine 160, in some embodiments, provides a platform for users to build, ship, and run the applications 176 or services 177 used on the containers 162. The container engine 160 also can be referred to as a container encapsulation system. An example of a container engine usable in at least some embodiments is the DOCKER container engine (available from DOCKER of San Francisco, Calif.). The containers 162 each include at least one container application 176 or container service 177, where all applications 176 in a given container can share the same binaries and libraries (not shown), as is understood. An example of a container usable in at least some embodiments is the DOCKER container. Each container 162, in some embodiments, can be implemented in the storage array 110 to have its own abilities, which abilities can be implemented via either or both of a service 177 and an application 176 running on the container, including but not limited to:

the ability to read and write from a specific volume on the storage array 110;

the ability to intercept I/O's arriving at a volume, and to perform operations using these I/O's (e.g., to terminate the I/O, redirect the I/O, reroute them, etc., and/or to perform other kinds of actions even before the I/O reaches the volume;

the ability to provide one or more services/applications usable to access one or more devices; and the ability to interrupt I/O as it moves along a data path.

Using these abilities of containers it is possible to create containers that can run various types of code in a very efficient way, because the code is already running within the storage array.

As noted above and in FIGS. 4A, 4B, in some embodiments, the containers 162 can share physical resources of the host/VM 104, such as central processor unit (CPU) (not shown) and memory 156. In some embodiments, the OS 158 is configured to prioritize the use of the physical resources of the container 162, such as CPU and memory, of the server, where the host OS 304 may prioritize their use among all the containers 330 in the node 300. In some embodiments, the containers 162 are not required to run on top of a host OS but instead can run on a container host infrastructure, like Dokker, as shown and described further herein in connection with FIG. 4C.

The storage array 110 can run the containers 162 to implement many different types of complex storage services in a portable way and can dynamically enhance the capabilities of the storage array 110 (and, as a result, of the production site 102 and/or replication site 122). That is, in at least some embodiments, the storage array 110 is able to generate a given application or service only when needed or in response to commands it receives. In at least some embodiments, setup of containers is intended to be relatively fast, so that container services can be created and destroyed on demand to match load and/or performance criteria. As shown in FIGS. 4D and 4E, in some embodiments, the capability of running a generic container inside a storage array 110 can be used to run one or more generic replication services inside the array 110. For example, in some embodiment, the production side and/or replication services are implemented as one or more container services, as shown in FIGS. 4D and 4E, including but not limited to a synchronization service 177A, a buffering service 177B, a deduplication service 177C, a security service 177D, a compression service 177F, and a continuous replication into local copy (CDP) service. In some embodiments, the services include a production side 1 temporal query application 176E and/or a replication side temporal query application 177K. Some of these are described further herein. These services or applications could be production side services that run on the production array, or copy side services (or applications) that run on the secondary array. In certain embodiments, the use of the term "applications" in the context of containers refers to any programs that are able to run on the containers. Such containers can, for example, be services as well. In certain embodiments, a temporal query is not different from security or filter services that also get parameters that are outside of the array data and act accordingly.

On the secondary array (which in FIG. 4D is array 110B on replication site 122, and in FIG. 4E is array 110B' on replication site 122'), replica side services in at least some embodiments include (but are not limited to) a replica synchronization service 177H, a five phase distribution service 177I, a high availability service 177J, a temporal query service 177K, an I/O filter service 177L, a decryption and decompression service 177M (these could, of course, be separate services), and a distribution service 177N. Some of these services are described more fully herein.

The illustrations of production and replica side services in FIGS. 4D and 4E are not meant to be exhaustive, nor are they illustrated to require that either the production and/or the replica sides have to have all of these applications/ services implemented. In some embodiments, these services can be written in a generic way like services that runs on an appliance in an external replication system. This will make them portable between storage arrays that support generic containers. In addition these applications/services, in some embodiments, can take advantage of the resources of the storage array 110 and its internal infrastructure that is not exposed to external hosts to become very efficient with low latency and low bandwidth footprint on the communication infrastructure of the production site. Containers are usable, in at least some embodiments, to implement one or more of the other functional blocks in the production site 102 and/or replication site 122, such as the DPA 108 and the splitter 106 and/or to implement virtually any function that can interact with and/or control I/O. In addition, although the illustrated examples of FIGS. 4D and 4E are not explicitly shown to have either the production or replication site be in the cloud, it is of course applicable to that environment.

FIG. 5 is a flow chart of a method 500 for operating a buffering service application in a container, in accordance with an illustrative embodiment. For example, in some embodiments, this method may be applicable to the buffering service container application 177B running within container 162A on the production site 102 of FIG. 4D or within replication site 102' of FIG. 4E, but this is not limiting. In a conventional, non-container environment, data sent from the production site 102 to the replication site 122 can take time, especially if the replication site 122 is configured as secondary storage. In at least some embodiments, this method 500 of FIG. 5 can provide production or replication side buffering of data lag, which can significantly reduce latency, because, effectively, another copy of data is already being kept inside the storage. For example, referring to FIGS. 4A-4D, 4E, and 5, once the buffering service is generated in a container at the production or replication site (block 505), this service will receive the write IOs that are intercepted by the splitter (block 510), either at the production side 102 if that is where the container is, or at the replication site 122', once the writes are received. The service buffers the write I/O's into memory (block 515) until the write I/O is acknowledged by its recipient. The metadata of the I/O's that are not sent to the replica are written persistently to the production journal (block 520) using an in-storage I/O operation I/O's. For example, in some embodiments, this is done so that, if the system crashes at either or both of the production side 102 or replication side 122' (or anywhere in between), resulting in a loss of the I/O's that are in memory, there will be a way to recover. In some embodiments, storing all the IO (data and meta data) can be performance consuming. However, storing just the metadata can be advantageous because the metadata itself is small in size and helps to mark or designate at least some of the areas that may need resyncing in case of a disaster. In some embodiments, the I/O that was buffered is eventually released (block 525) for transmission to the storage area of replica site 22 or any other site to which the data is being written, and this is done when at least a portion (e.g., a set) of the write I/O's have been acknowledged and are ready to release to storage at the replica site.

FIG. 6 is a flow chart of a method 600 for operating a synchronization service application in a container, in accordance with an illustrative embodiment. For example, in some embodiments, this method may be applicable to the production synchronization service container application 177A running within container 162A on the production site 102 of FIG. 4D and the replica synchronization service container application 177H (FIG. 4D), running within container 162B on the replication side 122 of FIG. 4D, and/or the synchronization service container application 177H' (FIG. 4E), but this is not limiting. In some embodiments, the synchronization service container application 177A, 177H, 177H' may be required when there is a need to synchronize the production volumes 112A to the replica copy volumes 112B. In some embodiments, the synchronization service container application 177A, 177H, 177H' can be required in snap-based replication or in continuous replication at the first full sweep or when short synchronization is needed due to a temporary disruption to the replication. The synchronization service container application 177A, 177H, 177H', in some embodiments, can take advantage of the in-storage I/O's (i.e., the ability to perform most of the I/O's within the same storage array 110) to save a substantial amount of bandwidth of the datacenter communication infrastructure and arrays front-end ports.

Referring to referring to FIGS. 4A-4E and FIG. 6, after the appropriate synchronization service container applications 177A and/or replica synchronization services 177H, 177H' are generated in the respective containers 162A, 162B at the production and replication sites, respectively (blocks 605, 610, respectively), I/O is read directly from the production site 102 into a synchronization service container (block 615) as well as being transmitted to replication site (e.g., as is done during normal replication). Using this I/O that has been copied as it is being transmitted, a synchronization copy is made (block 620). If, for example, there is a temporary disruption to the replication from production site 102 to replication site 122, 122' (block 625), or even within either the production site 102 or replication site 122, 122' the synchronization copy can be provided as needed (block 630).

Figure 7:
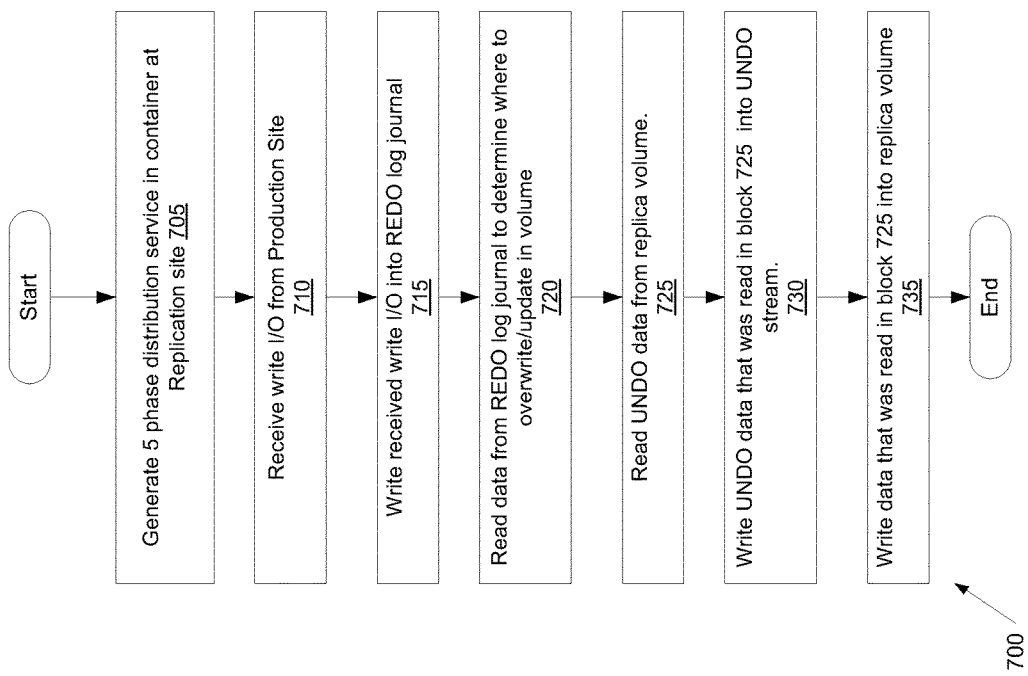
FIG. 7 is a flow chart of a method for operating a distribution service in a container, in accordance with an illustrative embodiment.

Yet another application of containers, in at least some embodiments, is with a replica side distribution process. For example, FIG. 7 is a flow chart of a method 700 for operating a distribution service application 177I in a container, in accordance with an illustrative embodiment. The replica side distribution process, in some embodiments, is an I/O intensive process in which read and write I/O to the journal 114 and the replica copy volumes 112 is made in order to keep the replica copy as close in time to the production copy, while keeping the history in journal. In some applications (e.g., DELL EMC RECOVERPOINT), this process is referred to as 5 phase distribution or 5 phase replication, because every write I/O done on the production site 102 leads to 5 distribution I/O's at the copy (replica) site 122: This is explained more fully below.

Referring, e.g., to FIG. 1, FIG. 4D, and/or FIG. 4E, when a production site 102 is sending data to a replication site 122, there is a splitter 106 that intercepts I/O at the production site. The splitter 106 then sends I/O to the DPA 108A on the production site 102 (i.e., the primary site) as well as data to a corresponding DPA 108B on the replica side. In accordance with at least some embodiments, doing all (or substantially all) of these 5 steps inside the storage array can give a significant performance benefits and reduce the footprint of the replication system. Referring to FIGS. 4A-4E and FIG. 7, as part of the above-identified "5 phase distribution" done within the storage arrays via the containers, as described herein, a 5 phase distribution service 177I is generated (block 705) at the replication site 122. The write I/O is received at replica site 122 from production site 102 (block 710). Then, the 5 phase distribution service application 177I in container 162B goes through these actions (the five phases):

(1) Write new incoming data into the journal 114B (e.g., into the REDO log journal or journal stream 114B at replication site 122) (block 715)

(2) Read data from REDO log journal to determine where to overwrite or update the volume 112B (block 720)—generally this can mean reading the oldest data (3) Read UNDO data from replica volume (block 725)—this can mean read current data from location to be written to at replication site 122

(4) Write UNDO data that was read in block 725 into UNDO stream (block 720)—this can mean to write the current data so that the replica volume at replicas site 122 may be able to be rolled back (5) Write data that was read in block 725 into the replica volume (block 725)—this can mean write the new data from the Do Stream to the replica volume 112B The above actions (1) through (5) (corresponding to blocks 715-735 in FIG. 7), which all in involve I/O's on the replication side 122, all are done, in some embodiments herein, using container applications running in a container 162B in the storage array 110B at the replica site 122. Thus, instead of requiring 5 separate writes from the production site 102 into the storage 110B (as is required in existing systems) employing a container at the storage array 110B on the replica side 122, with application services (running in one or more containers) to assist in implementing all of the functions right on the storage array 110B, will be significantly more efficient, with improved performance benefits and a smaller footprint for the replication system.

In some embodiments, the containers 162 described herein can be used within a replica storage array 110B to provide an application service providing a high availability (HA) backlog mirroring service application 177J. For example, in some embodiments, one or more storage arrays 110B provide a container 162B having an HA capabilities via a HA backlog mirroring service application 177J within the infrastructure of container 162B, to help to make the replication system much simpler. Having HA capabilities provided via an application running in a container, as shown in FIG. 4, helps to minimize difficulties arising from problems such as bad path flows (i.e., data attempting to be transmitted over a poorly functioning or non-functioning path), without having to resort to resource-intensive actions such as a "full sweep" (re-synchronizing an entire volume). In some embodiments, for example, a replication service running inside a container on a specific storage controller is configured to flip seamlessly to another controller following a controller failure.

In some embodiments, if HA of containers is not available, the replication service can protect at least in part from controller failure by sending at least the metadata relating to the data synchronously to another replication service running in a container on another storage controller. This kind of communication can take advantage of an in-storage communication infrastructure that is often much faster than the external communication infrastructures in the datacenter.

In some embodiments, containers 162 at the replication site 122 help to compensate for the problem of failures and/or bad paths at the replication side 122, by providing two containers at the storage array that are receiving the information, one to be the main replica receiving the data, and one acting as a mirror to that main replica, running within the same storage array 110 but under control of a different storage controller. In some embodiments, a replication service running inside the container on a specific storage controller will seamlessly flip to another controller following a controller failure or other issues or factors, such as another controller having better connectivity, to achieve improved load balancing, in conditions where an originating controller requires repair, replacement, or maintenance. Thus, even if the storage node that failed is the node running the container containing the latest changes, the data is mirrored in another location. Because the containers are both on the same storage array, the communication mechanism between them will be very efficient.

Figure 8:
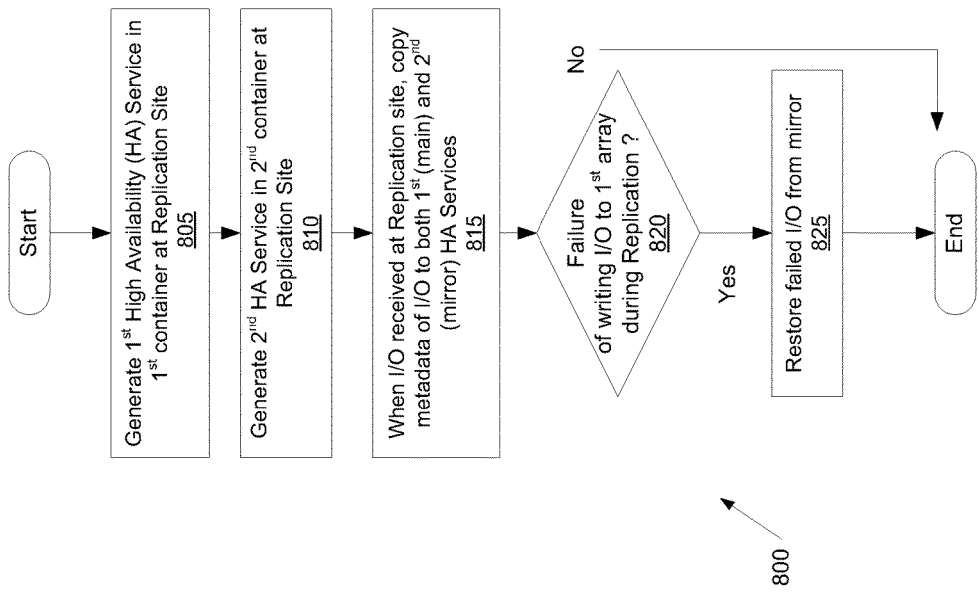
FIG. 8 is a flow chart of a method for operating a high availability (HA) service in a container, in accordance with an illustrative embodiment.

For example, FIG. 8 is a flow chart of a method 800 for operating such an HA backlog mirror service application 177J in a container 162B, in accordance with an illustrative embodiment. Referring to FIGS. 4A-4E and FIG. 8, a high availability (HA) service is generated in a first container at the first replication site run by a first controller and at a $2^{nd}$ container at a run by a $2^{nd}$ storage controller in the same storage array (blocks 805 and 810). When I/O is received at the $1^{st}$ replication site, the metadata for this I/O is copied to both the first (replica) and second (mirror) HA services (block 815). If there is a failure of writing I/O to a first array (e.g., the storage array 110B) during replication (answer at Block 810 is YES), then the failed I/O can be restored from the mirror HA site (block 825). In some embodiments, if there are multiple entities, it can be preferable to run HA services separately, so that storage controllers are unlikely to fail at the same time.

In some embodiments, continuous replication into local copy and/or continuous data protection (CDP) in a volume—either or both can be made extremely efficient, as all the components of the replication system can run on production array containers reducing the replication footprint to minimum and the external bandwidth requirements to zero. FIG. 9 is a flow chart of a method 900 for operating a continuous data protection (CDP) service application in a container, in accordance with an illustrative embodiment. In accordance with FIGS. 4A-4E and FIG. 9, a continuous data protection (CDP) service application 177G is generated in a container 162 at production site 102 (block 905). Intercepted I/O is received (optionally from another container), as it is sent to the replication site 122, to create a snapshot at the replication site (block 910). Data from this volume is driven into a journal (block 915). The journal is used for continuous replication into a local copy (block 920).

Thus, as the above embodiments illustrate, it is possible, in at least some embodiments, to move a lot of abilities of a data recovery system from the appliance directly into the storage, in a generic type of way, by using a container to support the necessary paradigm or basic model of the function it is replacing. For example one paradigm or model is that, in some embodiments, a container can be implemented in a storage array to act like an I/O filter driver, where the container gets an I/O from a volume, and can intercept and terminate the I/O, send it to another volume, etc.

Another paradigm is that, in some embodiments, a container can be implemented in a storage array to be able to read and write to other devices. Having a container in a storage array, able to read and write, enables the creation, in some embodiments, of very generic replication solutions that can permit communication between and among multiple storage arrays, which is very easy to deploy. This enables the creation, in some embodiments, of a very generic type of data source in the storage area. In some embodiments, additional features are checked before the containers are implemented at the storage array 110, such as security features and permissions. The permissions and security feature scan help define what parts of an LU 112 a container is able to access, and what types of functions a container can run.

As noted above, the advantage of implementing generic containers at the storage array, include, but are not limited to:
  allowing the development of a generic and portable replication system that is as efficient as native replication system;
  saving a lot of bandwidth from the datacenter infrastructure
  reducing the load on the arrays from-end ports
  taking advantage of internal storage infrastructures and services that are not exposed to external hosts.

In a further aspect of the embodiments described herein, assuming that compute containers exist on a secondary storage node (e.g., replication site 122), it is possible to use this compute power, and its proximity (low latency) access to the storage array 110 to run queries that are not possible (or not easy/quick to do) when accessing the secondary storage normally. For example, in some embodiments, by using a container at a secondary storage node to respond to queries relating to information over a period of time, such as temporal queries, such queries are able to search not just exposed data (as is done with normal types of database searches) but also internal data (e.g., metadata). Being able to search internal data means that a search engine is able to quickly scan metadata for updates (e.g., daily updates) to any given point in time—and seeing information in metadata (which is typically not exposed information) that is indicative of changes helps to more accurately find the correct PITs to mount in response to the original query. The search results can inform the requester not just that data (e.g., a file) has changed, but what specifically in the data has changed. In known systems that do not run containers in this manner, when a PIT database for a given date is mounted (e.g., as a snapshot on a SCSI endpoint or when it is rolled to a requested point in time), such metadata is not available for searching. Thus, it can be more difficult to know whether the PIT data that is mounted will lead to the desired information.

Normal access to point in time (PIT) information relies, in at least some arrangements, on mounting a PIT as a snapshot on a small computer system interface (SCSI) endpoint or, alternatively, on determining the desired timestamp date of a PIT and then rolling the storage device(s) to the desired PIT. The bureaucracies involved require significant overhead in operations and time. However, the intimate access that on storage compute has to the PIT information (e.g., via containers configured on the storage array, as described herein) and the access speed and low latency due to this proximity, can allow, in some embodiments, for cutting those almost completely, which in turn allows for a new set of queries to be efficient: temporal queries (i.e., search queries that search not only one point in time but rather a plurality of points in time, or even all points in time).

With existing systems, a mounted PIT can be searched for data on it. Once found, the data can be returned or modified in some cases. However, trying to determine which PIT to query in the first place is not easy. Some existing systems keep a "catalog," which is a dump of the file system directory and file list. This allows finding when a file exists or has changed by looking at the file metadata. Then, when a candidate is found, the PIT is mounted and can be searched, though nothing ensures that the PIT is the correct one—so the process has to be repeated until the desired data is found, or it is determined that the device being stored does not have the desired data stored on it.

At least some of these issues are addressed, in some embodiments, through use of an on-storage compute container (that is, a container configured to be part of the storage array 110, as has been described herein) that has much faster access to PIT data and the internal structure of the array 110. Using an on-storage computer container can, in some embodiments, allow functions that include, but are not limited to:

Searching all data on all points in time

Search a limited disk area across all points in time (the area where a file is placed for example)

Query for when differences of data or meta data occurred across PITs

Query for a particular change in data/metadata.

Analysis of data patterns across time

Generating query return results that include not just data that has been changed, but also when it changed and what the changes were In some embodiments, use of one or more compute containers that have been configured to work on a storage device 110 can help a system to perform temporal queries more efficiently at least because: (a) the container has faster data path access; (b), the container can be made aware of dedupe or other data manipulations and use it to avoid searching multiple times or to know when a change occurred, and (c) the container has access to structural metadata which can point to where/when changes happened. Advantageously, in some embodiments, this level of awareness and knowledge of data changes is possible in configurations where the container is designed by the storage vendor, so that the code running in the container is aware of the format of the data in the storage. That is, a container, in some embodiments, is designed to have knowledge of the way data is stored and the way information about data changes is stored, so that code running in the container is able to evaluate the stored information and/or metadata to determine one or more factors that can alter the way a search might be conducted, e.g., by altering the format of the second temporal query. In the example of some embodiments where a container is configured with knowledge of the format of data in storage, the container can provide an API which will allow the temporal query to access and/or manipulate the stored information appropriately. Thus, in some embodiments, the base code for the container accessing a storage device provided by a predetermined vendor will be provided by that predetermined vendor.

In addition, in some embodiments, temporal queries are able to be performed more efficiently because steps like mounting and restoring, etc., can be eliminated because the process already is running on the secondary storage. Thus, it is possible to almost immediately search all PIT in parallel, but much faster than it is done without use of containers configured on secondary storage. In some embodiments, using a container to help query and access a storage device also enables PIT access to metadata, not just at the file level but also at the block level. For example, in some embodiments, instead of mounting some or all of a volume immediately, metadata is searched or scanned directly to see if anything has changed. If anything has changed, in some embodiments, it may be necessary only to mount the portion containing data corresponding to the information that changed.

FIG. 10 is a flow chart 1000 of an illustrative method for operating a temporal query service application in a container, in accordance with an illustrative embodiment. Referring to FIGS. 4A-4E and 10, a temporal query application is configured (e.g., generated) in a container configured as part of a storage array, where the container is in operable communication with a data storage entity (block 1005). In at least some embodiments, in response to a first query that is received (block 1010) the temporal query that is generated for use as a 2nd temporal query (block 1015) is formed at least in part based on an awareness or knowledge of the temporal structure of the volume, storage device, or other data storage entity being searched, such that the 2nd temporal query is formed at least in part based on knowledge of the temporal structure. For example, in some embodiments, a structure of a temporal query generated in accordance with a temporal query service comprises a query format configured to be compatible with a temporal structure of the volume or other data storage entity. Queries formed at least partially using this knowledge of temporal structure can query for changes or query data more efficiently across the PITs as compared to queries formed without such knowledge, or more "generic" types of queries. Thus, for example, a temporal query can be structured and configured to substantially match, coordinate, or be compatible with, at least some of the temporal information in the entity being queried. When a query is received it is parsed (block 1010) to determine a set of query parameters, which in some embodiments includes a search listing parameters of interest, including but not limited to parameters such as time parameters (e.g., date, time, timestamp, time interval, time period, time instants, access times, one or all points in time, etc.), and data parameters (including but not limited to location of data, time/timestamp of creation of the data, size of data, content of data, author/owner of data, etc.). Based on the query parameters and on information known about the temporal structure of the data storage entity, a 2nd temporal query is formed (block 1015). Advantageously, in some embodiments, the query is generated via a temporal service application 176E configured in a container 162B that is part of a storage array 110B at a secondary storage array (e.g., replication storage array 110B of FIG. 4E). In some embodiments, it is not necessary to mount data in a standard format to be able to generate a query; rather the container is, as noted above, configured so that it is aware of the target data format, so the container provides, within the container itself, an appropriate language to format a query. In some embodiments, the query could be received into a temporal query service application 176E running in a container 162 that is configured as part of a production array 110A at a production site 102, especially if the data to be accessed also is accessible in storage array 110A at the production site 102, such as in LU 112A and/or journal LU 114A. In some embodiments, a temporal service application 176E running on a container 162B configured as part of storage array 110A at a production site 102 generates the query to the replication site 122, where it is received at a temporal query service 177 (e.g., as shown in FIGS. 4D, 4E) running in the container 162B configured as part of storage array 110B at the replication site 122. The query process is more efficient, however, if the query is run as close as possible to where the data is stored, as will be appreciated (e.g., run at the replica site 122, 122'). As noted above, in some embodiments, the container 162 is configured to be aware of the format of data in the array and thus can work more efficiently when the user gets a query language and can run a script in this language inside the container.

Once the respective temporal query service application (e.g., 176E or 176K) receives the query, it accesses all applicable or appropriate date or metadata at the respective data storage entity/data storage site (e.g., storage array 110A or storage array 110B), over the appropriate one or more points in time, to get information related to the query and/or needed to respond to the query (block 1020). In some embodiments, the locations to access to respond to the query, and other actions, depend on the nature of the query, as blocks 1025-1060, discussed further below, indicate. Note that the order of analysis of the query in blocks 1025-1060 is not limiting; these checks can made in any order, or even all at once. The order shown is there merely to help show how different searches can occur, in parallel, using containers, right at the storage device itself. In addition, the listed types of queries are illustrative and not limiting; many other types of queries are, of course, usable with at least some embodiments.

Referring to FIGS. 4A-4E and 10, if the data parameter in the query requires a search of all points in time (or multiple points in time) (that is, the answer at block 1025 is Yes), then the container running at the storage array 110 (assume for this example the array is storage array 110B and replication site 122) accesses all applicable data or metadata at the respective data storage entity/site (e.g., LUN 112B and/or Journal LU 114), in parallel, over designated PITS, if applicable, to respond to the query (block 1030). For some types of queries (see block 2015), in some embodiments, this may require looking at all PITs or multiple PITS. In some embodiments, the action in block 1030 would be executed by the temporal query service application 176K at container 162B, if the query were to search all data on all points in time, or to search a limited disk area across all points in time (such as searching the area where a file is placed, for example). After block 1030 is completed, processing moves to block 1032, to analyze and locate changes (if any) to the data that is being retrieved (block 1032). This can be done, in some embodiments, by accessing the metadata, where the metadata can help determine what changed in each data storage entity (e.g., a volume), when it changed, and what the change was, not just at the file level, but at the block level. In some embodiments, locating changes (if any) to the data being retrieved (block 1032) comes from scanning the data itself. Optionally, in block 1034, the data storage entity (e.g., a volume) being queried can be mounted if data or metadata has changed. Then, in block 1036, query return results are generated, including information on changes (if any) to the data, and then processing from block 1036 moves to block 1070, where query return results (or an error message, if applicable) are returned to the entity that submitted the query at block 1005 (where the entity could be a user, another application, another server or computing system, etc.).

Referring back to block 1025, if at block 1025 the answer No, a check can be made to see if the query relates to looking for an analysis of data patterns across time (block 1035). If the answer is yes, then the application 176 executing in the container running at the storage array 110 proceeds to block 1030, with a processing path as described above. If at block 1035 the answer is No, a check can be made (block 1040) to see if the query relates to looking to see if a change in data or a change in metadata (i.e., differences of data or metadata) has occurred across multiple PITs (block 1040). If the answer is yes at block 1040, processing proceeds to the block 1030 processing path as described above. If the answer is no at block 1040, then processing moves to see if the query relates to looking to see if any data or metadata have changed (block 1055). If the answer at block 1055 is YES, then processing moves to the block 1032 along the block 1030 processing path, as described above.

If the answer was NO at block 1055, then processing moves to block 1060, where a check is made for a specific change in data or metadata (block 1060). If the answer at block 1060 is yes, then processing moves to block 1032 as noted above. If the answer to respond to the query (block 1060) is no, then query results returned to the requester, if applicable, where the results can be empty if no results can be found to be responsive to the query. As with conventional query systems, in some embodiments, error messages may be generated if there are issues with access to a given location that is attempting to be queried, or if a given query is unparseable. As will be appreciated, in some embodiments, a container can be configured to dynamically determine what to return to a user based on results or based on a given query. For example, in some embodiments, a container can include code for processes to implement antivirus scans that run inside the storage array to look for virus signatures and the time such signatures were created. If a virus is found, the container can send out a report of which files were infected and when; if no files round, report an empty answer. The container also can dynamically scan query return result for viruses or other issues. The container also can return an error message is (e.g., indicating e.g., unparseable query, etc.).

At least some embodiments of the above-identified methods for temporal queries on secondary storage provide certain advantages over current approaches. For example, by performing the queries directly on the secondary storage array (e.g., directly on a data storage entity), there is no need to mount or restore data, which can take time. Searching using containers on secondary storage can be much faster. With containers configured at a storage array, as described herein, it becomes possible to query and access information not usually exposed to a user, such as metadata (i.e., metadata indicating what changed in a given data storage entity, such as a volume and when it changed). By scanning data or metadata (e.g., by scanning a directory containing such metadata, volume snapshot structure or file system inode structure), it only becomes necessary to mount certain data (e.g., PIT data) if it is known that a change occurred. This technique is different than, for example, conventional indexing a secondary location in advance, because with indexing or pre-indexing, a user can only mount what has been previously indexed. Advantageously, in some embodiments, however, at least some embodiments herein can be adapted to work with indexing to help better focusing the sorting by knowing where to do indexing and where to sort.

Another advantage provided in at least some embodiments is that a container 162 can access the internal data structure of the device where data is stored (e.g., a storage array, or any type of data storage entity) and can run as a part of the storage array 110 itself, thus allowing the complex workload of the query to be ran closer to the data itself, increasing efficiency. It will be appreciated that containers 162 located in the storage array 110 can be implemented with other kinds of services, applications or other functions that may run more effectively or efficiently by being run closer to where data is stored, as noted elsewhere herein.

In some described embodiments, hosts 104 and 116 of FIG. 1 may each correspond to one computer, a plurality of computers, or a network of distributed computers. For example, in some embodiments, host 104, and/or host 116 may be implemented as one or more computers such as shown in FIG. 11. As shown in FIG. 11, computer 1100 may include processor 1102, volatile memory 1104 (e.g., RAM), non-volatile memory 1106 (e.g., one or more hard disk drives (HDDs), one or more solid state drives (SSDs) such as a flash drive, one or more hybrid magnetic and solid state drives, and/or one or more virtual storage volumes, such as a cloud storage, or a combination of physical storage volumes and virtual storage volumes), graphical user interface (GUI) 1108 (e.g., a touchscreen, a display, and so forth) and input/output (I/O) device 1120 (e.g., a mouse, a keyboard, etc.). Non-volatile memory 1106 stores computer instructions 1112, an operating system 1116 and data 1118 such that, for example, the computer instructions 1112 are executed by the processor 1102 out of volatile memory 1104 to perform at least a portion of the processes shown in FIGS. 5-10. Program code may be applied to data entered using an input device of GUI 1108 or received from I/O device 1120.

Processes herein (e.g., FIGS. 5-10) are not limited to use with the hardware and software of FIG. 11 and may find applicability in any computing or processing environment and with any type of machine or set of machines that may be capable of running a computer program. The processes described herein may be implemented in hardware, software, or a combination of the two. The logic for carrying out the method may be embodied as part of the system described in FIG. 11, which is useful for carrying out a method described with reference to embodiments shown in, for example, FIGS. 4A-10. The processes described herein are not limited to the specific embodiments described. For example, processes of FIGS. 5-10 are not limited to the specific processing order shown in FIGS. 5-10. Rather, any of the blocks of the processes may be re-ordered, combined, or removed, performed in parallel or in serial, as necessary, to achieve the results set forth herein.

Processor 1102 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs). In some embodiments, the "processor" may be embodied in one or more microprocessors with associated program memory. In some embodiments, the "processor" may be embodied in one or more discrete electronic circuits. The "processor" may be analog, digital, or mixed-signal. In some embodiments, the "processor" may be one or more physical processors or one or more "virtual" (e.g., remotely located or "cloud") processors.

Various functions of circuit elements may also be implemented as processing blocks in a software program. Such software may be employed in, for example, one or more digital signal processors, microcontrollers, or general-purpose computers. Described embodiments may be implemented in hardware, a combination of hardware and software, software, or software in execution by one or more physical or virtual processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

For example, when the program code is loaded into and executed by a machine, such as the computer of FIG. 11, the machine becomes an apparatus for practicing the invention. When implemented on one or more general-purpose processors, the program code combines with such a processor to provide a unique apparatus that operates analogously to specific logic circuits. As such a general-purpose digital machine can be transformed into a special purpose digital machine. FIG. 12 shows Program Logic 1210 embodied on a computer-readable medium 1230 as shown, and wherein the Logic is encoded in computer-executable code configured for carrying out the reservation service process of this invention and thereby forming a Computer Program Product 1200. The logic may be the same logic on memory loaded on processor. The program logic may also be embodied in software modules, as modules, or as hardware modules. A processor may be a virtual processor or a physical processor. Logic may be distributed across several processors or virtual processors to execute the logic.

In some embodiments, a storage medium may be a physical or logical device. In some embodiments, a storage medium may consist of physical or logical devices. In some embodiments, a storage medium may be mapped across multiple physical and/or logical devices. In some embodiments, storage medium may exist in a virtualized environment. In some embodiments, a processor may be a virtual or physical embodiment. In some embodiments, a logic may be executed across one or more physical or virtual processors.

For purposes of illustrating the present embodiment, the disclosed embodiments are described as embodied in a specific configuration and using special logical arrangements, but one skilled in the art will appreciate that the device is not limited to the specific configuration but rather only by the claims included with this specification.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:

1. A computer-implemented method, comprising:
   configuring a storage system comprising a first processor in operable communication with a storage array, the storage array comprising a second processor and at least one data storage entity in operable communication with the second processor;
   configuring a container to execute within the storage array on top of the second processor, wherein the container provides a virtual operating system environment configured to provide at least one isolated user space execution context, wherein the container is configured to be in operable communication with the data storage entity and is configured to access the storage array from within the storage array;
   configuring the container to control and run a temporal query service operating from within the storage array, wherein the temporal query service is configured to generate a temporal query, from within the storage array, to the data storage entity, wherein a structure of the temporal query generated in accordance with the temporal query service comprises a query format configured to be compatible with a temporal structure of the data storage entity, and wherein the temporal query service is configured to:
      parse at least a first temporal query received at the temporal query service from a requesting entity to determine a set of temporal query parameters, the set of temporal query parameters relating to data stored on the data storage entity;
      query the data storage entity with a second temporal query formed in accordance with the set of query parameters and formed to be compatible with a temporal structure of the data storage entity; and
      return temporal query results to the requesting entity responsive to the first and second temporal queries, the temporal query results based at least in part on the set of query parameters.

2. The method of claim 1, wherein the second temporal query is generated in accordance with predetermined information relating to a format of data storage on the data storage entity, the predetermined information enabling the second temporal query to access portions of the data storage entity that provide information relating to changes in data stored on the data storage entity.

3. The method of claim 2, wherein the predetermined information enables the second temporal query to access metadata on the data storage entity, the metadata providing information relating to changes in data.

4. The method of claim 2, wherein the predetermined information enables the second temporal query to scan a plurality of data locations to determine changes in data.

5. The method of claim 1, wherein the storage array is configured as secondary storage in operable communication with the storage system.

6. The method of claim 1, further comprising:
   analyzing, in response to the second temporal query, one or more portions of the data storage entity to determine how at least a portion of data responsive to the second temporal query has changed; and
   including in the temporal query return results information relating to how the data has changed.

7. The method of claim 1, further comprising:
   analyzing one or more portions of the data storage entity that provide information relating to changes in data stored on the data storage entity to determine at least one point in time (PIT) responsive to the second temporal query; and
   configuring the storage system to mount the at least one PIT in response to the second temporal query.

8. The method of claim 1, further comprising executing the second temporal query in accordance with predetermined information relating to a format of data storage on the data storage entity, the predetermined information enabling the second temporal query to modify the way the second temporal query is executed.

9. A storage system, comprising:
   a first processor; and
   a storage array in operable communication with the processor, the storage array comprising:
      a second processor
      a data storage entity in operable communication with the second processor, the data storage entity storing computer-accessible data; and
      a container configured for executing within the storage array on top of the second processor, the container in operable communication with the data storage entity and configured to access the storage array from within the storage array, wherein the container provides a virtual operating system environment configured to provide at least one isolated user space execution context, wherein the container is configured to control and run a temporal query service operating from within the storage array, wherein the temporal query service is configured to generate a temporal query, from within the storage array, to the data storage entity, wherein the structure of the temporal query generated in accordance with the temporal query service comprises a query format configured to be compatible with a temporal structure of the data storage entity, and wherein the temporal query service is configured to:
         parse at least a first temporal query received at the temporal query service from a requesting entity to determine a set of temporal query parameters, the set of temporal query parameters relating to data stored on the data storage entity;
         query the data storage entity with a second temporal query formed in accordance with the set of query parameters and formed to be compatible with a temporal structure of the data storage entity; and return temporal query results to the requesting entity responsive to the first and second temporal queries, the temporal query results based at least in part on the set of query parameters.

10. The system of claim 9, wherein the second temporal query is generated in accordance with predetermined information relating to a format of data storage on the data storage entity, the predetermined information enabling the second temporal query to access portions of the data storage entity that provide information relating to changes in data stored on the data storage entity.

11. The system of claim 10, wherein the predetermined information enables the second temporal query to access metadata on the data storage entity, the metadata providing information relating to changes in data.

12. The system of claim 10, wherein the predetermined information enables the second temporal query to scan a plurality of data locations to determine changes in data.

13. The system of claim 9, wherein the storage array is configured as secondary storage in operable communication with the storage system.

14. The system of claim 9, wherein the temporal query service is configured to:
analyze, in response to the second temporal query, one or more portions of the data storage entity to determine how at least a portion of data responsive to the second temporal query has changed; and
include in the temporal query return results information relating to how the data has changed.

15. The system of claim 8, wherein the temporal query service is configured to:
analyze one or more portions of the data storage entity that provide information relating to changes in data stored on the data storage entity to determine at least one point in time (PIT) responsive to the second temporal query; and
configure the storage system to mount the at least one PIT in response to the second temporal query.

16. A computer program product including a non-transitory computer readable storage medium having computer program code encoded thereon that when executed on a processor of a computer causes the computer to operate a storage system, the computer program product comprising:
computer program code for providing a storage system comprising a processor and a storage array, the storage array comprising a second processor, a data storage entity in operable communication with the second processor, the data storage entity, storing computer-accessible data, and a container configured for executing within the storage array on top of the second processor, the container in operable communication with the data storage entity and configured to access the storage array from within the storage array, wherein the container provides a virtual operating system environment configured to provide at least one isolated user space execution context;
computer program code for configuring the container to control and run a temporal query service operating from within the storage array, wherein the temporal query service is configured to generate a temporal query, from within the storage array, to the data storage entity, wherein the structure of the temporal query generated in accordance with the temporal query service comprises a query format configured to be compatible with a temporal structure of the data storage entity;
computer program code for parsing at least a first temporal query received at the temporal query service from a requesting entity to determine a set of temporal query parameters, the set of temporal query parameters relating to data stored on the data storage entity;
computer program code for querying the data storage entity with a second temporal query formed in accordance with the set of query parameters and formed to be compatible with a temporal structure of the data storage entity; and
computer program code for returning temporal query results to the requesting entity responsive to the first and second temporal queries, the temporal query results based at least in part on the set of query parameters.

17. The computer program product of claim 16, further comprising:
computer program code for generating the second temporal query in accordance with predetermined information relating to a format of data storage on the data storage entity, the predetermined information enabling the second temporal query to access portions of the data storage entity that provide information relating to changes in data stored on the data storage entity.

18. The computer program product of claim 16, further comprising
computer program code for analyzing, in response to the second temporal query, one or more portions of the data storage entity to determine how at least a portion of data responsive to the second temporal query has changed; and
computer program code for including in the temporal query return results information relating to how the data has changed.

19. The computer program product of claim 16, further comprising:
computer program code for analyzing one or more portions of the data storage entity that provide information relating to changes in data stored on the data storage entity to determine at least one point in time (PIT) responsive to the second temporal query; and
computer program code for configuring the storage system to mount the at least one PIT in response to the second temporal query.

20. The computer program product of claim 16, further comprising:
computer program code for executing the second temporal query in accordance with predetermined information relating to a format of data storage on the data storage entity, the predetermined information enabling the second temporal query to modify the way the second temporal query is executed.

* * * * *